(12) United States Patent
Lal et al.

(10) Patent No.: US 11,287,444 B2
(45) Date of Patent: Mar. 29, 2022

(54) ARRAY ATOMIC FORCE MICROSCOPY FOR ENABLING SIMULTANEOUS MULTI-POINT AND MULTI-MODAL NANOSCALE ANALYSES AND STIMULATIONS

(71) Applicant: The Regents of the University of California, Oakland, CA (US)

(72) Inventors: Ratneshwar Lal, La Jolla, CA (US); Qingqing Yang, San Diego, CA (US); Qian Ma, San Diego, CA (US); Zhaowei Liu, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/283,929

(22) PCT Filed: Oct. 8, 2019

(86) PCT No.: PCT/US2019/055273
§ 371 (c)(1),
(2) Date: Apr. 8, 2021

(87) PCT Pub. No.: WO2020/076877
PCT Pub. Date: Apr. 16, 2021

(65) Prior Publication Data
US 2021/0396783 A1    Dec. 23, 2021

Related U.S. Application Data

(60) Provisional application No. 62/742,875, filed on Oct. 8, 2018.

(51) Int. Cl.
*G01Q 20/02* (2010.01)
*G01Q 70/06* (2010.01)
(Continued)

(52) U.S. Cl.
CPC .............. *G01Q 20/02* (2013.01); *G01Q 60/40* (2013.01); *G01Q 60/42* (2013.01); *G01Q 70/06* (2013.01)

(58) Field of Classification Search
CPC ........ G01Q 20/02; G01Q 60/40; G01Q 60/42; G01Q 70/06
(Continued)

(56) References Cited

U.S. PATENT DOCUMENTS

RE33,387 E    10/1990    Binnig
2001/0002275 A1*    5/2001    Oldenburg ............... B01J 13/02
427/214
(Continued)

OTHER PUBLICATIONS

ISA, International Search Report and Written Opinion for International Patent Application No. PCT/US2019/055273. dated Jan. 13, 2020. 11 pages.
(Continued)

*Primary Examiner* — Nicole M Ippolito
(74) *Attorney, Agent, or Firm* — Perkins Coie LLP

(57) ABSTRACT

Disclosed is an atomic force microscopy system includes a laser source configured to generate an optical probe beam containing light of different spectral light components at different optical wavelengths, a dispersive optical device positioned to receive the optical probe beam and configured to disperse the optical probe beam into different dispersed light beams that are at different optical wavelengths and are spatially separated from one another, a cantilever array including a plurality of cantilevers structured to detect a sample and configured to deflect the different dispersed light beams by moving in position based on an interaction with the sample to produce multiple deflected output beams at different output optical wavelengths from the cantilevers, and a plurality of photodetectors to receive the multiple
(Continued)

deflected output beams of different wavelengths from the cantilevers, respectively.

21 Claims, 30 Drawing Sheets

(51) Int. Cl.
    *G01Q 60/42*     (2010.01)
    *G01Q 60/40*     (2010.01)

(58) Field of Classification Search
    USPC ...... 850/1, 2, 3, 5, 6, 33, 37, 38, 39, 40, 42, 850/56
    See application file for complete search history.

(56) References Cited

U.S. PATENT DOCUMENTS

| | | |
|---|---|---|
| 2004/0213443 A1 | 10/2004 | Haussecker et al. |
| 2005/0195407 A1* | 9/2005 | Nordin ............... G01N 21/7703 356/501 |
| 2006/0152787 A1 | 7/2006 | Knebel et al. |
| 2014/0289912 A1* | 9/2014 | Andreev ............... G01Q 30/20 850/18 |
| 2014/0368829 A1 | 12/2014 | Dell et al. |
| 2015/0138507 A1 | 5/2015 | Thomsen et al. |
| 2015/0138941 A1 | 5/2015 | Suzuki |
| 2015/0285836 A1 | 10/2015 | Humphris et al. |

OTHER PUBLICATIONS

Lang, H.P. et al. "Sequential position readout from arrays of micromechanical cantilever sensors" Appl. Phys. Lett., 1996, vol. 72, No. 3, pp. 383-385.

Sulcheck, T. et al. "Parallel atomic force microscopy with optical interferometric detection" Applied Physics Letters, 2001, vol. 78, No. 12, pp. 1787-1789.

Tsukruk, V. et al. "Adhisive and Friction Forces between Chemically Modified Silicon and Silicon Nitride Surfaces" Langmuir, 1998, vol. 14, pp. 446-455.

* cited by examiner

ARRAY ATOMIC FORCE MICROSCOPY FOR ENABLING SIMULTANEOUS MULTI-POINT AND MULTI-MODAL NANOSCALE ANALYSES AND STIMULATIONS

PRIORITY CLAIM AND CROSS REFERENCE TO RELATED APPLICATIONS

This patent document is a 371 National Phase Application of International Application No. PCT/US2019/055273, filed on Oct. 8, 2019, which claims priority to and benefits of U.S. Provisional Patent Application No. 62/742,875 entitled "ARRAY ATOMIC FORCE MICROSCOPY FOR ENABLING SIMULTANEOUS MULTI-POINT AND MULTI-MODAL NANOSCALE ANALYSES AND STIMULATIONS" filed on Oct. 8, 2018. The entire contents of the aforementioned patent applications are incorporated by reference as part of the disclosure of this patent document.

STATEMENT REGARDING FEDERALLY SPONSORED RESEARCH OR DEVELOPMENT

This invention was made with government support under R01_AG028709 awarded by the National Institutes of Health. The government has certain rights in the invention.

TECHNICAL FIELD

This patent document relates to atomic force microscopy technologies.

BACKGROUND

Nanoscale multipoint structure-function analysis is essential for deciphering complexity of multiscale biological and physical system. An atomic force microscopy (AFM) allows nanoscale structure-function imaging in various operating environment and can be integrated seamlessly with disparate probe-based sensing and manipulation technologies. However, conventional AFMs only permit sequential single-point analysis; widespread adoption of array AFMs for simultaneous multi-point study is still challenging due to the intrinsic limitations of the existing technological approaches.

SUMMARY

Disclosed are methods, devices and applications pertaining to array atomic force microscopy (AFM) based on dispersive optics and capable of simultaneously monitoring multiple probe-sample interactions.

In some embodiments of the disclosed technology, an atomic force microscopy system includes a laser source configured to generate an optical probe beam containing light of different spectral light components at different optical wavelengths, a dispersive optical device positioned to receive the optical probe beam and configured to disperse the optical probe beam into different dispersed light beams that are at different optical wavelengths and are spatially separated from one another, a cantilever array including a plurality of cantilevers structured to detect a sample and configured to deflect the different dispersed light beams by moving in position based on an interaction with the sample to produce multiple deflected output beams at different output optical wavelengths from the cantilevers, and a plurality of photodetectors to receive the multiple deflected output beams of different wavelengths from the cantilevers, respectively, wherein each photodetector is operable to detect a change in direction or position of each received deflected output beam, wherein the dispersive optical device and the cantilever array are positioned to spectrally and spatially map the plurality of cantilevers to the different dispersed light beams from the dispersive optics at different optical wavelengths such that each cantilever is illuminated by light at a distinguished optical wavelength.

In some embodiments of the disclosed technology, a system includes a light illumination device configured to generate a plurality of dispersed light beams that are at different optical wavelengths and are spatially separated from one another, a probe device including a plurality of cantilevers structured to detect interactions between one or more samples and the plurality of cantilevers, each of the plurality of cantilevers configured to deflect the plurality of dispersed light beams by moving in position based on the interactions with the one or more samples to produce a plurality of deflected output beams at different output optical wavelengths from the plurality of cantilevers, and a detection device structured to receive the plurality of deflected output beams of different wavelengths from the plurality of cantilevers to map the plurality of deflected output beams to properties of the one or more samples by detecting changes in direction or position of the plurality of deflected output beams.

The subject matter described in this patent document can be implemented in specific ways that provide one or more of the following features.

Figure 1:
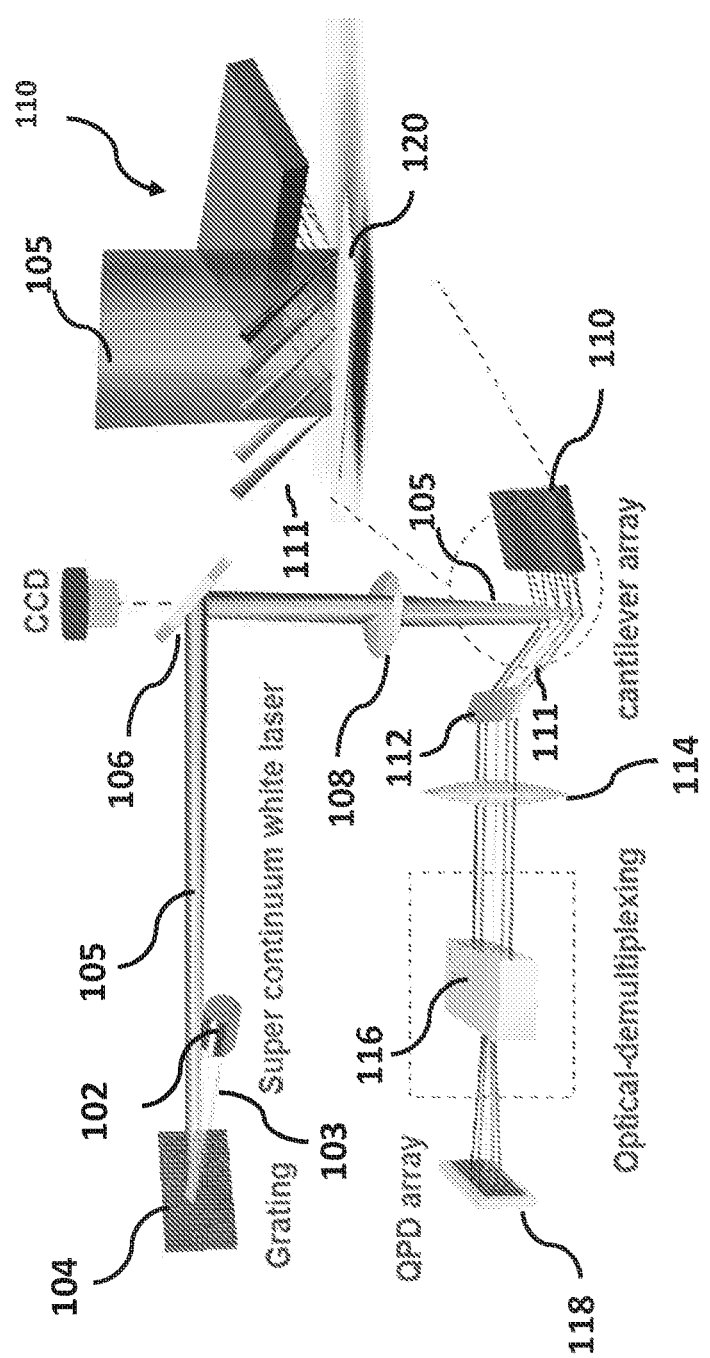
FIG. 1 illustrates an example of spectral-spatially encoded array (SEA)-atomic force microscopy (AFM) system implemented based on some embodiments of the disclosed technology.

Additional drawings are included in the attached appendices, which form a part of the present patent document.

DETAILED DESCRIPTION

High resolution multipoint simultaneous structure-function analysis has emerged of great interest in a broad spectrum of fields for deciphering multiscale dynamics, especially in biophysics and material science. However, currently available techniques are limited in terms of versatility, resolution, throughput, and biocompatibility. This patent document discloses, among others, novel multifunctional imaging platforms, including a dispersive-optics-based array atomic force microscopy (AFM) capable of simultaneously monitoring multiple probe-sample interactions. These novel platforms show high sensitivity, minimum crosstalk and multitudes of probe-based sensing, which can be demonstrated by parallel multiparametric imaging, ranging from morphology to hydrophobicity and electric potential in both air and liquid. Furthermore, parallel simultaneous structure-function analysis in dynamic system using various embodiments of the disclosed technology shows mechanical wave propagation in soft polymer film and cooperative intercellular activities of live heart cells sheds new light on the study of emergent properties in wide-range fields.

A multifunctional imaging platform implemented based on some embodiments of the disclosed technology shows high sensitivity, minimum crosstalk and multitudes of probe-based sensing. This is demonstrated by parallel multiparametric imaging, ranging from morphology to hydrophobicity and electric potential in both air and liquid. Furthermore, mechanical wave propagation in soft polymer film and cooperative intercellular activities of live heart cells are also explored. As the first experimental demonstration of using Array AFM for parallel simultaneous structure-function analysis in dynamic system, this work sheds new light on the study of emergent properties in wide-range fields.

In some embodiments of the disclosed technology, a single supercontinuum laser beam is utilized to spatially and spectrally map multiple cantilevers, so that the beam deflection from individual cantilever can be isolated and recorded by distinct wavelength selection. This new design provides a remarkably simplified yet effective solution to overcome the optical crosstalk, while maintaining sub-nm sensitivity and compatibility with probe-based sensors. Various implementation examples disclosed in this patent document can demonstrate the versatility and robustness of the AFM system on parallel multi-parametric imaging, ranging from surface morphology to hydrophobicity and electric potential in both air and liquid, and the applications on investing mechanical wave propagation in polymeric film and live hearts cells intercellular activity, providing new opportunities for studying emergent properties of atomic-scale mechanical and physicochemical interactions in a wide range of biological and physical networks. Array AFMs implemented based on some embodiments of the disclosed technology can also be used to obtain high-resolution, dynamic nanoscale structural and functional maps of synaptic networks and their changes in response to various amyloids as part of research towards understanding the mechanisms underlying Alzheimer's disease pathology.

Dynamic multiscale systems ranging from nano-heterostructured materials, surface and inter-surface sciences, intricate biological networks to sensors and devices have unique emergent properties due to complex structure-function coordination among the constituent units. Our understanding of these multiscale interactions has been limited by the paucity of appropriate tools allowing real-time and simultaneous nanoscale structure-function study of multiple subcomponents in complex systems. Common approaches, including multi-electrode arrays, fluorescent indicators, ultrasound imaging and magnetic resonance imaging enable recording and tracking activities in situ but have limited spatial resolution. Electron microscopy (EM) has high-resolution capabilities but is unsuitable for live biological systems due to environment constraints. Atomic force microscopy (AFM), on the other hand, uses interaction between a nanoscale probe and sample allowing resolution extended to nano/sub-nano scales, enabling examination of objects such as nanoparticles, proteins, DNAs, and even single molecules under physiological conditions. Additionally, functionalized AFM probes have been developed for quantitatively measuring various physicochemical properties, including thermal energy, chemical force, conductance and magnetism. However, these studies are limited to single point study at a time. To overcome the application of AFM to single points, array AFM platform that can achieve high-resolution multi-point simultaneous imaging and mapping physico-chemical properties is expected to have wide applicability in investigating the cooperative and coordinated activities of various biological and physical systems.

The AFM works by measuring cantilever deflection proportional to sample-probe interaction force. Among all the available array AFM readout system, optical beam deflection (OBD) is the most simple and robust method. However, the main limitation of OBD is that it is difficult to be scaled down for closely compacted cantilever array due to optical crosstalk, which is particularly important for short-range investigations for example, single cell study. Alternative solution combining expanded illumination laser beam with multi-frequency cantilever actuation, reduces optical crosstalk by driving each cantilever with different frequencies, but restricts the cantilever to work only under dynamic mode and cannot simultaneously perform with other AFM modalities that require a firm tip-sample contact, such as measurement of chemical forces and mechanical properties. Another optical method, interferometric readout, overcomes crosstalk and maintains high sensitivity, but it is complicated in setup, limited to small displacement and highly sensitive to environmental noise. Except optical readout, electronic readouts involving capacitance, piezoresistivity, piezoelectricity and metal-oxide semiconductor field-effect have also been used for cantilever array detection but are limited by microfabrication complexity and bio-compatibility.

To overcome these limitations, spectral-spatially encoded array AFM (SEA-AFM), which is an OBD readout method based array AFM platform, may achieve simultaneous multi-point and multiparametric nanoscale analyses. In some embodiments of the disclosed technology, a single supercontinuum laser beam and dispersive optical elements are utilized to spectrally and spatially map an array of cantilevers such that each cantilever has a unique wavelength channel. The deflected beams from multiple cantilevers can be addressed simultaneously and independently via wavelength selection. In this way, the system is significantly simplified and the crosstalk problem is overcome while maintaining the high sensitivity.

System Design

Figure 2:
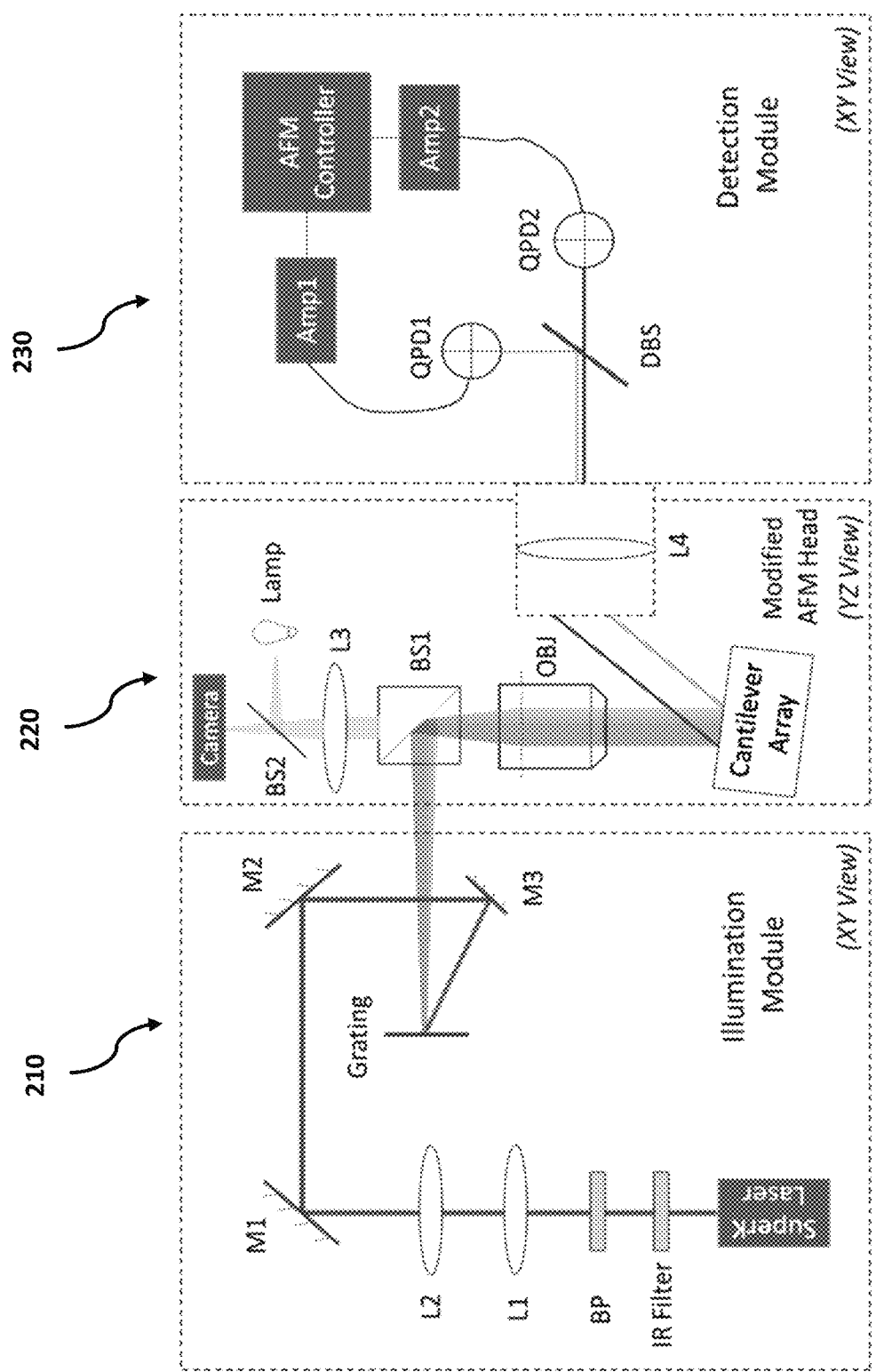
FIG. 2 illustrates a schematic of SEA-AFM optical setup implemented based on some embodiments of the disclosed technology.

The design and working principle of the spectral-spatially encoded array AFM implemented based on some embodiments of the disclosed technology is shown in FIGS. 1-2. FIG. 1 illustrates an example of the SEA-AFM system implemented based on some embodiments of the disclosed technology. In some implementations, an atomic force microscopy system implemented based on some embodiments of the disclosed technology includes a laser source 102, a dispersive optics including a grating 104, a mirror 106, and lenses 108 and 112, a cantilever array 110, a light directing device 112, an optical demultiplexer 116, and a plurality of photodetectors 118. The laser source 102 generates a laser beam 103 containing light of different spectral light components at different optical wavelengths. The dispersive optics may disperse the laser beam into different dispersed light beams 105 that are at different optical wavelengths and are spatially separated from one another. The cantilever array including a plurality of cantilevers may be structured to detect a sample 120, and may deflect the different dispersed light beams 105 by moving in position based on an interaction with the sample to produce multiple deflected output beams 111 at different output optical wavelengths from the cantilevers. For example, a laser produced by the laser source 102 (e.g., a supercontinuum laser), reflected by the grating 104 (e.g., groove 300 mm$^{-1}$), transmits through a focusing lens 108 and projects a spectral gradient onto a cantilever array 110. Each cantilever of the cantilever array 110 is illuminated by light with distinct wavelength. The atomic force microscopy system implemented based on some embodiments of the disclosed technology may also include a plurality of photodetectors 118 to receive the multiple deflected output beams 111 of different wavelengths from the cantilevers of the cantilever array 110, respectively. Each photodetector is operable to detect a change in direction or position of each received deflected output beam. Here, the plurality of photodetectors may be position-sensitive optical detectors. For example, the beams deflected by the array of cantilevers 110 are monitored by different position-sensitive optical detectors each of which measures a change in a position or direction of a beam e.g., quadruple photo detectors (QPDs) that are placed relative to an optical frequency demultiplexing component 116, such as a series of dichroic beam-splitters and filters for separating the deflected beams and routing the deflected beams to their respective position-sensitive optical detectors. The dispersive optics 104, 106, 108 and the cantilever array 110 are positioned to spectrally and spatially map the plurality of cantilevers 110 to the different dispersed light beams from the dispersive optics 104, 106, 108 at different optical wavelengths such that each cantilever is illuminated by light at a distinguished optical wavelength.

FIG. 2 illustrates a schematic of SEA-AFM optical system implemented based on some embodiments of the disclosed technology. A probe light source for producing light of different optical probe wavelengths, such as a supercontinuum laser, is used to generate the probe beam which propagates through a bandpass filter BP ranging from 630 nm to 660 nm, lens L1 and L2 forming a 2× beam expansion system, mirrors M1, M2, M3, 50:50 beam splitters BS1, BS2, a tube lens (e.g., 200 mm tube lens) L3, a plano-convex lens (e.g., 50 mm plano-convex lens) L4, an objective lens (e.g., 10× long working distance objective lens) OBJ, a quadruple photo detector QPD, a dichroic beam splitter DBS, and a programmable amplifier AMP. Through these propagation paths, the SEA-AFM projects a spectral gradient of the laser onto a cantilever array.

As shown in FIG. 2, the SEA-AFM optical system may include an illumination module 210, an AFM head 220, and a detection module 230. In the illumination module 210, the probe beam generated by the probe light source such as supercontinuum laser (superK laser) propagates through an infra-red (IR) filter, a bandpass (BP) filter, and one or more lenses (e.g., L1, L2), and one or more mirrors (e.g., M1, M2, M3). The probe beam is then dispersed at a disperse grating to be directed to the AFM head 220.

The AFM head 220 may include one or more beam splitters (e.g., BS1, BS2), one or more lenses (e.g., L3, L4, objective lens OBJ), and an array of cantilevers placed relative to a sample (not shown). In one example, additional optical devices such as a camera and a lamp can be used to focus the probe beam onto the sample. The probe beam (e.g., broadband light beam) from the probe light source such as a supercontinuum laser is reflected by a dispersive grating and the stretched probe beam is projected onto the array of cantilevers. The image of the projected spectrally gradient laser beam on the array of cantilevers. In one example, the array of cantilevers is structured to detect a sample and deflect the stretched probe beam by moving the positions of the cantilevers based on interactions between the cantilevers and the sample to produce multiple deflected output beams at different output optical wavelengths from the cantilevers.

The detection module 230 may include a dichroic beam splitter DBS, one or more photodetector (e.g., QPD1, QPD2), one or more amplifiers (e.g., Amp1, Amp2), and a controller (e.g., AFM Controller). In some implementations, the one or more photodetectors receive the multiple deflected output beams of different wavelengths from the cantilevers, respectively. Each photodetector is operable to detect a change in direction or position of each received deflected output beam, which is used to analyze the sample based on the interactions with the cantilevers. In one example, the deflected beams of different wavelengths from multiple cantilevers are separated by an optical demultiplexing device (e.g., a series of dichroic beam splitters) and detected by an array of quadrant photodetectors. Since deflection of each cantilever is proportional to sample-probe interaction force, the SEA-AFM optical system implemented based on some embodiments of the disclosed technology can control each cantilever individually, allowing for independent sensing from each cantilever. Furthermore, independent actuation allows for real-time positioning and modulation of the interaction force between the cantilevers and the sample.

Figure 3:
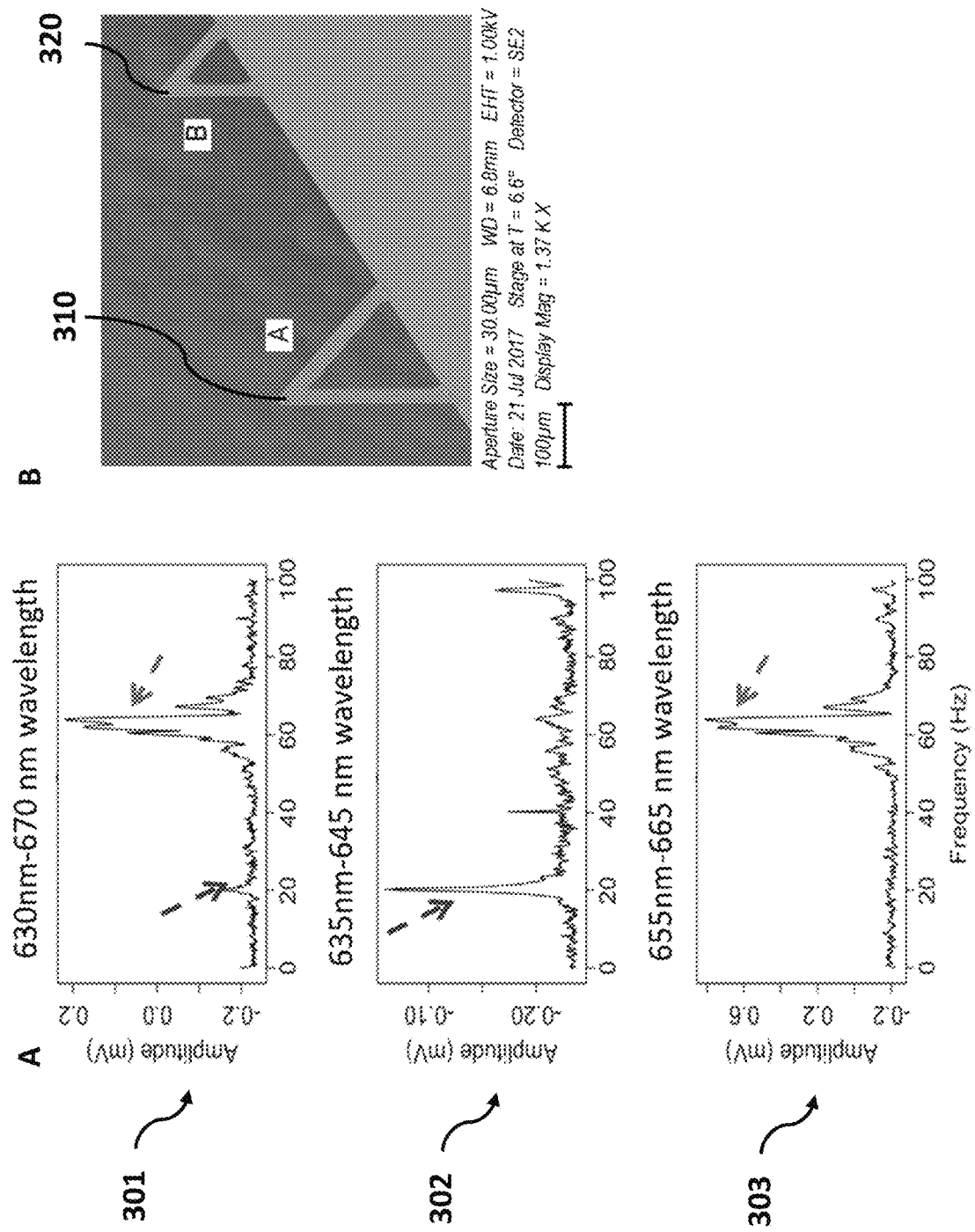
FIG. 3A illustrates SEA-AFM detection in dynamic mode where the cantilever array is vibrated under tuning mode in the vibrating frequency range from 0-100 kHz.
FIG. 3B shows SEM image of the two-cantilever array.

FIG. 3A illustrates SEA-AFM detection in dynamic mode where the cantilever array is vibrated under tuning mode in the vibrating frequency range from 0-100 kHz. By adjusting the laser wavelength range using the band pass filter, two resonant peaks at 23 kHz and 65 kHz with the 630-670 nm wavelength (301), single resonant peak at 23 kHz with the 635-645 nm wavelength range (302) and at 65 kHz with 655-665 nm wavelength range (303). FIG. 3B shows SEM image of the two-cantilever array. The long cantilever A 310 has smaller resonant frequency in the range of 14-26 kHz compared with the shorter cantilever B 320 which resonant frequency in the range of 40-75 kHz.

The dispersive optics-based readout method minimizes the crosstalk by assigning each cantilever an independent wavelength channel. As shown in FIGS. 3A and 3B, a proof-of-concept test shows that two cantilevers can be read out individually by wavelength selection through the SEA-AFM approach. A frequency sweep is performed from 0 to 100 kHz while vibrating the cantilever array, and a QPD is used to monitor the beam reflection from two cantilevers. For incident laser beams with wavelengths from 630 nm to 670 nm, two characteristic peaks corresponding to the resonance frequencies of the cantilevers are observed (301). For 640 nm (10 nm Bandwidth) laser beam, only a 23 kHz peak is observed (302). For 660 nm wavelength (10 nm Bandwidth), only a 65 kHz peak is observed (303).

Crosstalk between two cantilevers was absent as determined by cantilevers separation and the focal spot size at each wavelength channel. For the system shown in FIG. 2, about 16 μm illumination spot size at a single wavelength channel determines the minimum separation of two cantilevers without obvious crosstalk. The 'rainbow' beam that is projected on the cantilever array has a length of 1.2 mm, making it suitable to illuminate up to about 70 cantilevers (16 μm separation) without significant crosstalk meanwhile not further complexing the illumination system. Significantly, this method can be adapted to illuminate a 2D AFM array with a larger number of tips via slight modification of optics.

The illumination path, consisting of a supercontinuum laser, a reflective grating, and an objective lens, delivers a 'rainbow' like beam to the cantilever array. Each cantilever is illuminated by a distinct wavelength, and hence, measuring beam deflection at certain wavelength can isolate the information from every cantilever.

The minimum separation between two cantilevers determines the maximum number of cantilevers can be packed and parallelly read in an array AFM system. The minimum separation is determined by the illumination spot at a wavelength channel, and is derived as following:

The spot size of illumination at a single wavelength yield to $$2w_0 = \left(\frac{4\lambda}{\pi}\right)\left(\frac{f}{D}\right) \quad \text{(Eq. 1)}$$

where $w_0$ is the gaussian beam waist, D is the diameter of laser beam, and f is the focal length of objective lens (20 mm).

In the system implemented based on an embodiment of the disclosed technology, central operation wavelength is about 645 nm, and beam diameter is 1 mm. The diameter of the focal spot will be:

$$2w_0 = 16.4 \ \mu m \quad \text{(Eq. 2)}$$

The lateral separation of two focal spots (at two distinct wavelengths) is $$S = f^* \Delta\lambda/d \quad \text{(Eq. 3)}$$

where S is the lateral separation of two wavelengths at cantilever plane, d is the grating period (1/300 mm) and $\Delta\lambda$ is the difference of two wavelengths. S needs to be larger than the spot size of illumination at a single wavelength in order to minimize the cross-talk between cantilevers.

For using a spectrum from 500-700 nm, it illuminates two cantilevers separated as large as 1.2 mm.

For a minimum spacing of 16.4 μm, $$\Delta\lambda = 2.73 \text{ nm} \quad \text{(Eq. 4)}$$

Hence, two closely packed cantilevers will have their deflection beams differed 3 nm in spectrum. In principle, the array AFM can image up to ~70 cantilevers. By further optimizing the system, the minimum space between two neighbor cantilevers could be pushed smaller, and the number of the detectable cantilevers could be even larger. In practice, the physical size of the cantilever, the reflection intensities and the targeted sample surface roughness will actually limit the number of cantilevers that can be packed in the system.

Parallel Topography Imaging

Figure 4:
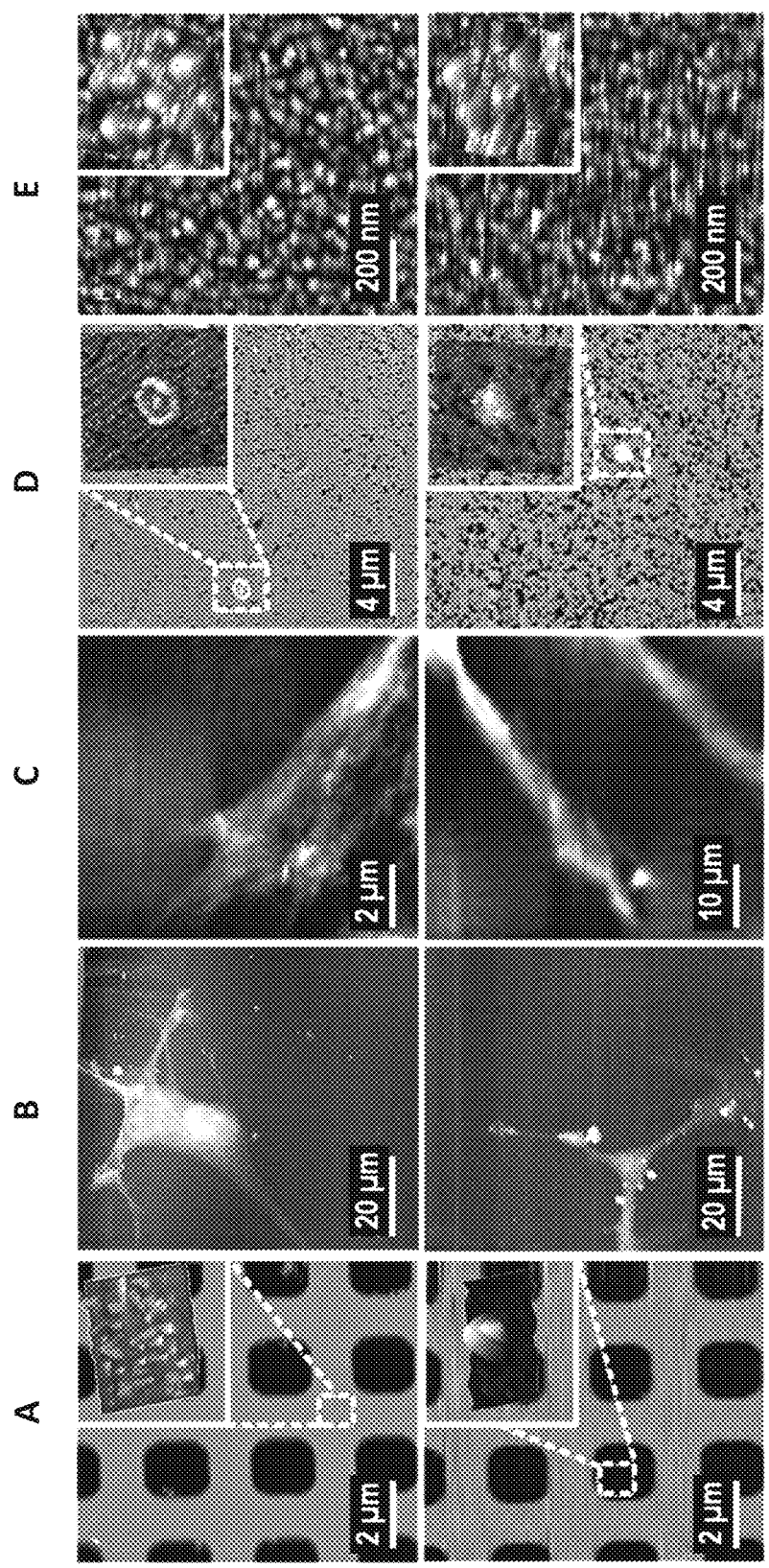
FIG. 4A shows standard calibration grid (pitch size: 3 µm) where top inset indicates 1 µm×1 µm and bottom inset indicates about 600 nm×600 nm.
FIG. 4B shows fixed human differentiated neural progenitor cells (NPCs) derived from induced pluripotent stem cells (iPSCs) in air.
FIG. 4C shows live NPCs in fluid.
FIG. 4D shows filtered seawater samples on 0.22 µm track-etched polycarbonate membranes with different types of captured particulate matter where insets indicate 4 µm×4 µm.
FIG. 4E shows sputtered gold nanoparticles where top inset indicates about 200 nm×200 nm and bottom inset indicates 150 nm×150 nm.
Figure 5:
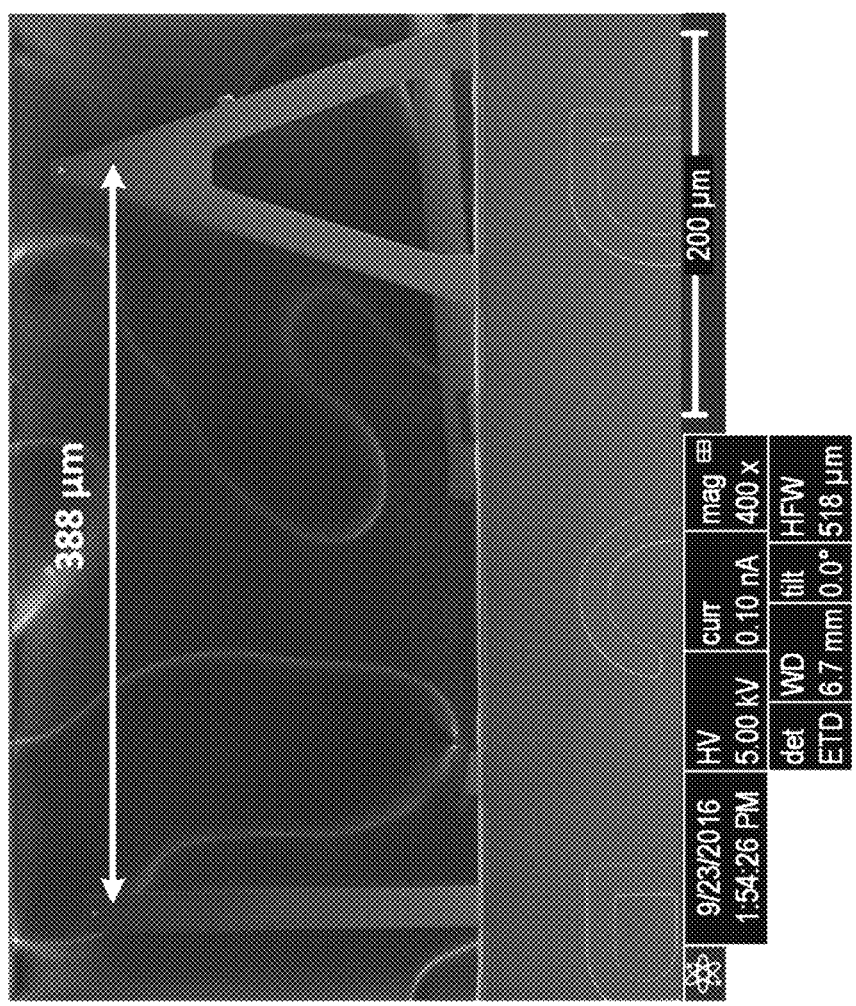
FIG. 5 shows SEM image of the parallel cantilevers used for imaging and detecting in the systems implemented based on various embodiments of the disclosed technology.

FIGS. 4A-4E shows parallel SEA-AFM morphology imaging of various samples using double cantilevers (top images are from cantilever 1, and bottom images are from cantilever 2). FIG. 4A shows standard calibration grid (pitch size: 3 μm) where top inset indicates 1 μm×1 μm and bottom inset indicates about 600 nm×600 nm. FIG. 4B shows fixed human differentiated neural progenitor cells (NPCs) derived from induced pluripotent stem cells (iPSCs) in air. FIG. 4C shows live NPCs in fluid. FIG. 4D shows filtered seawater samples on 0.22 μm track-etched polycarbonate membranes with different types of captured particulate matter where insets indicate 4 μm×4 μm. FIG. 4E shows sputtered gold nanoparticles where top inset indicates about 200 nm×200 nm and bottom inset indicates 150 nm×150 nm. FIG. 5 shows SEM image of the parallel cantilevers used for imaging and detecting in the systems implemented based on various embodiments of the disclosed technology. Here, the distance between the two cantilevers is 388 μm.

To evaluate the feasibility of the array AFM system for parallel topography imaging, two different areas on the calibration grating were imaged simultaneously in constant height mode with a soft silicon nitride cantilever array as shown in FIG. 4A and FIG. 5. Crosstalk between the two cantilevers is not observed. To further demonstrate the resolution under various types of samples, the parallel cantilever array was then employed to image fixed and live human differentiated neural progenitor cells, filtered seawater samples and sputtered gold nanoparticles as shown in FIGS. 4B-4E. These imaging modality measurements may validate the applicability of the SEA-AFM system for the demanding parallel AFM topography imaging in air and liquid.

Parallel Structure-Function Mapping

Figure 6:
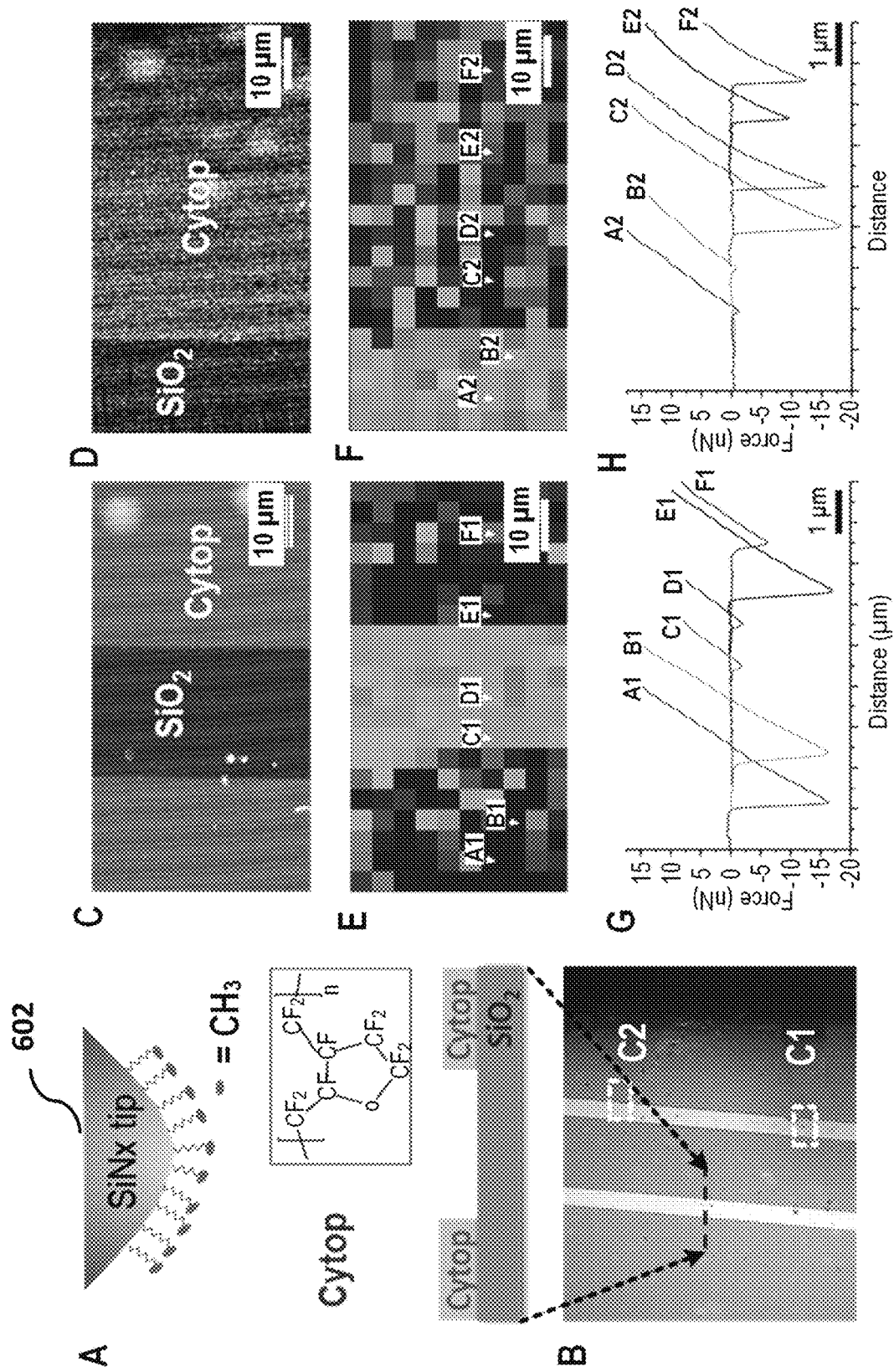
FIG. 6A shows schematic of octadecyltrichlorosilane (OTS)-functionalized hydrophobic tip.
FIG. 6B shows schematic and optical images of the Cytop-SiO2 sample where insets (C1, C2) demonstrate areas imaged in FIGS. 6C and 6D, respectively.
FIGS. 6C and 6D show parallel SEA-AFM morphology images.
FIGS. 6E and 6F show parallel adhesion maps of the areas in FIGS. 6C and 6D.
FIGS. 6G and 6H show typical force-distance curves measured at the indicated locations in FIGS. 6E and 6F.

FIGS. 6A-6H show parallel structure-hydrophobicity mapping in water. FIG. 6A shows schematic of octadecyltrichlorosilane (OTS)-functionalized hydrophobic tip. FIG. 6B shows schematic and optical images of the Cytop-SiO$_2$ sample where insets (C1, C2) demonstrate areas imaged in FIGS. 6C and 6D, respectively. FIGS. 6C and 6D show parallel SEA-AFM morphology images. FIGS. 6E and 6F show parallel adhesion maps of the areas in FIGS. 6C and 6D. FIGS. 6G and 6H show typical force-distance curves measured at the indicated locations in FIGS. 6E and 6F.

A major advantage of the SEA-AFM is its compatibility to varied probe-based sensors for multifunctional imaging thanks to the simplicity and sensitivity of the optical lever readout mode. As illustrated in FIG. 6A, example applications of the SEA-AFM include a chemically functionalized tip 602 for yielding a hydrophobic surface to discern hydrophilic and hydrophobic areas by adhesion force measurements. In some implementations, the chemically functionalized tip 602 may include chemically functionalized SiNx AFM tips with CH3-terminated monolayer of octadecyltrichlorosilane (OTS) yielding a hydrophobic surface that can discern hydrophilic and hydrophobic areas by adhesion force measurements. FIG. 6B shows the schematics and optical image of the sample where hydrophobic fluoropolymer Cytop is patterned onto a hydrophilic SiO2 glass slide. Morphology and hydrophobicity maps were imaged in deionized water (DI). AFM images simultaneously taken on two sample areas shown in FIG. 6C and FIG. 6D, which are outlined in FIG. 6B. The areas were investigated by force mapping to measure the adhesion forces with the functionalized tips. The simultaneous force mapping of the two areas are shown in FIGS. 6E and 6F. Each pixel of the adhesion maps gives the absolute value of the peak height (attractive forces are negative). In the two resulting adhesion maps, larger adhesion forces may be detected on the Cytop patterns, the hydrophobic areas terminated with CF2 groups; smaller adhesion forces were found on the hydrophilic silicon dioxide areas with silanol Si—OH groups on the surface. Six groups of typical retraction force-distance curves are plotted in FIGS. 6G and 6H, with corresponding pixels marked on the adhesion maps with the same colors as the force curves. Quantitatively, the attraction force on the hydrophobic area is about 9 times larger than the force recorded from the hydrophilic area.

Simultaneous multi-point structure-hydrophobic mapping is a useful tool to better understand biological processes. Moreover, the applicability of the functionalized probe is not limited to structure-hydrophobic mapping and could be extended to other probe sensors, such as thermal, chemical and pH etc. Example applications of the SEA-AFM also include using conductive parallel AFM to simultaneously detect surface morphology and electric potential. Altogether, these measurements highlight the multiparametric characterization capabilities of the SEA-AFM.

Figure 7:
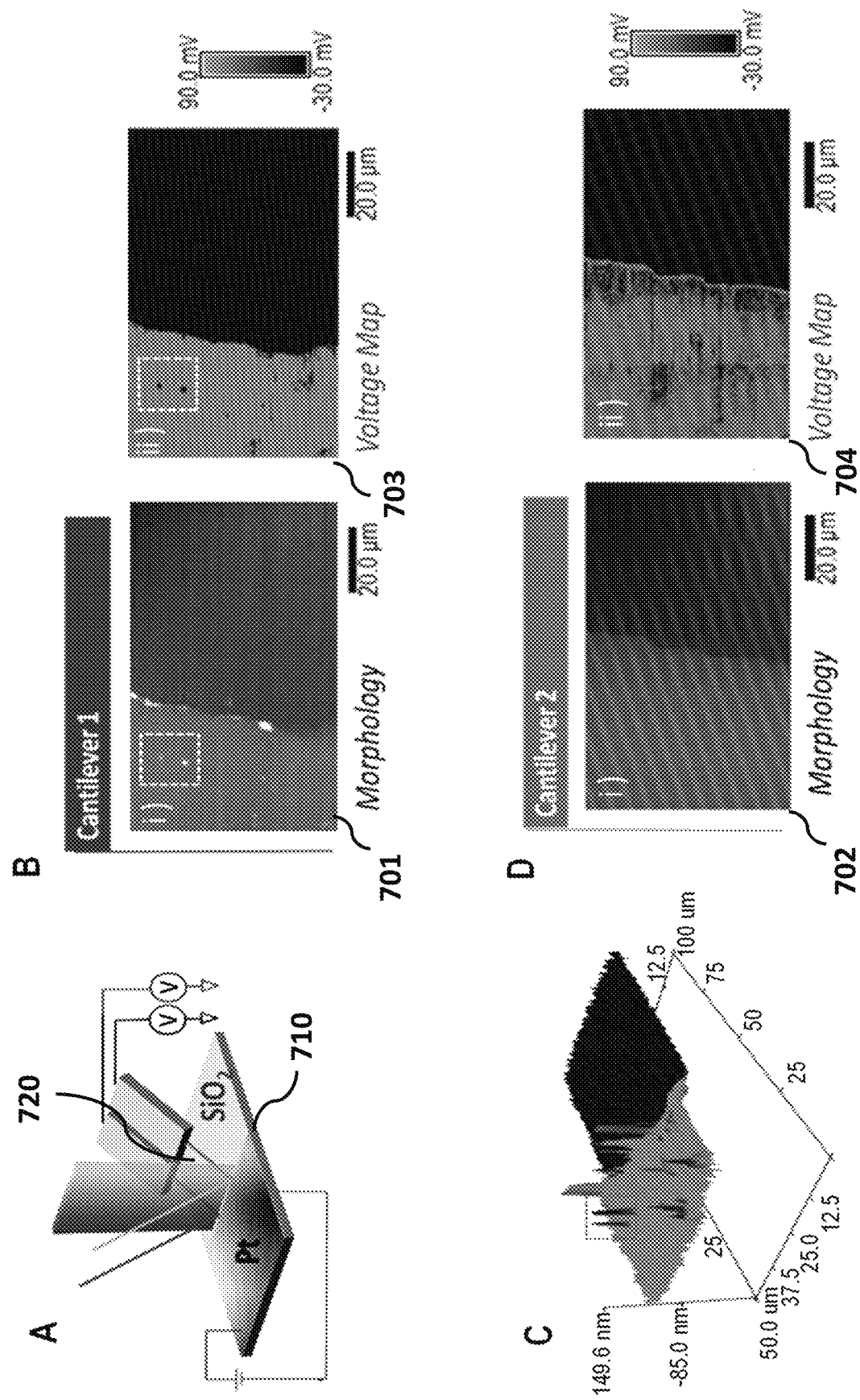
FIG. 7A shows schematic of using the conductive SEA-AFM to detect the surface electric potential.
FIGS. 7B and 7D show simultaneously recorded constant height mode topographic images and respectively electric potential images obtained with conductive doped diamond-coated probes.
FIG. 7C shows a 3D overlay of electric potential and topology.

FIGS. 7A-7D show surface electric potential imaging. FIG. 7A shows schematic of using conductive cantilevers 720 of the SEA-AFM to detect the surface electric potential. The sample 710 is $SiO_2$ substrate partially coated with Pt. FIGS. 7B and 7D show simultaneously recorded constant height mode topographic images 701, 702, and respectively electric potential images 703, 704 obtained with conductive doped diamond-coated probes. FIG. 7C shows a 3D overlay of electric potential 703 and topology 701. The color scale represents voltage (−30 mV-90 mV) and is projected onto the 3D representation of the height data from the topology 801. Small non-conductive particles on Pt with relatively large data and close to zero voltage are marked by a square on FIG. 7B and FIG. 7C.

This patent document also discloses the potential application of using conductive SEA-AFM for multipoint simultaneous structure and surface electric potential mapping. Two conductive diamond cantilevers may be mounted in parallel on custom printed circuit board for integration with a custom AFM cantilever holder to be utilized with an AFM system. Thin platinum film with a thickness around 100 nm is sputtered and patterned on SiO2 glass slide. Around 70 mV bias is applied on the Pt region, while SiO2 substrate is grounded. The schematic of the setup is shown in FIG. 7A. The topographic image 701 and electric potential image 703 in FIG. 7B are the AFM morphology images using cantilever 1 and cantilever 2 in constant height mode. The simultaneous electric voltage mapping of the two areas are shown in electric potential images 703, 704 in FIGS. 7B and 7D. In FIG. 7C, the electric potential data (703) has been projected onto the 3D reconstruction of the topography (701). As can be seen from the area marked with a square in FIG. 7C, the small nonconductive particles on the Pt film have comparatively large height but close zero electric potential.

Detection of Mechanical Wave Propagation on Soft Polymer Film

Figure 8:
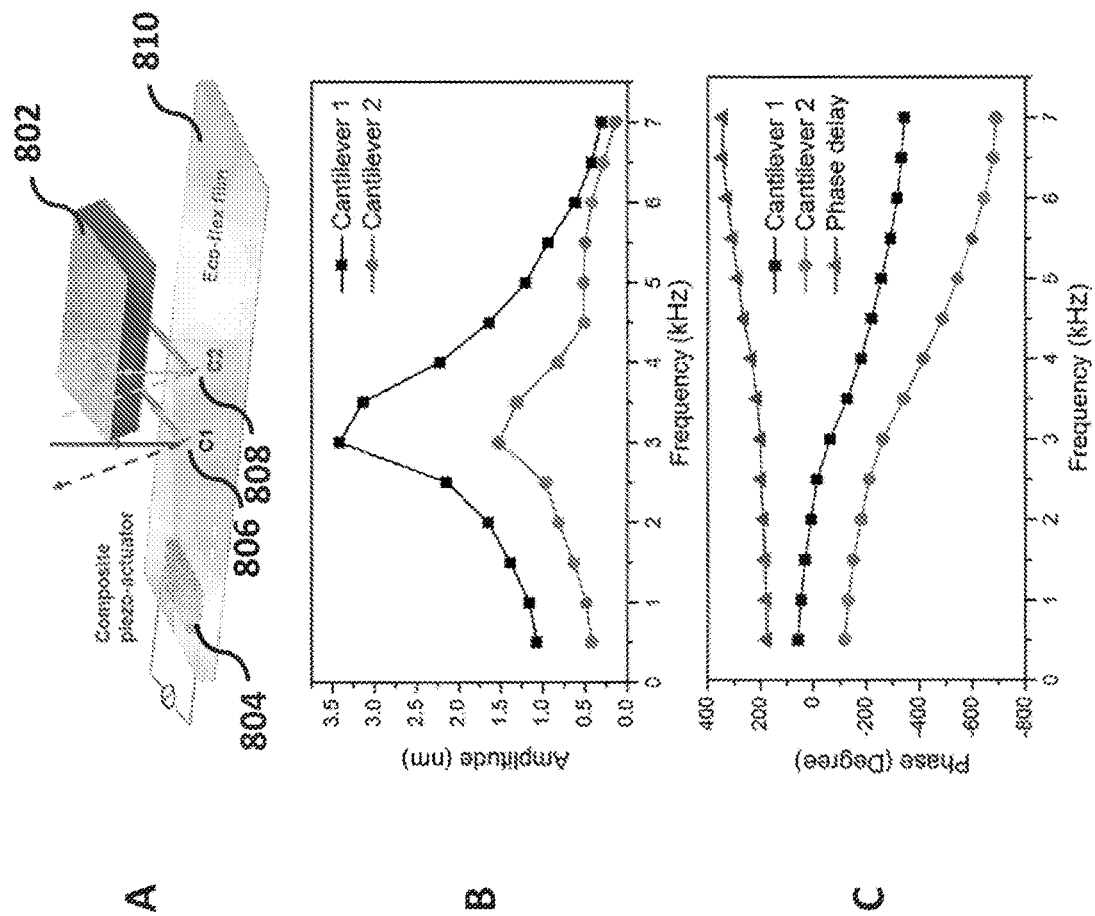
FIG. 8A shows schematic of using the array AFM (with two cantilevers) to detect the wave propagation in a piezoelectric actuator encapsulated polymer film.
FIG. 8B shows the frequency dependent amplitude.
FIG. 8C shows phases of cantilever 1 and cantilever 2, and the phase delay between the two probes.

FIGS. 8A-8C shows mechanical wave propagation sensing. FIG. 8A shows schematic of using the array AFM 802 including a plurality of cantilevers (two cantilevers C1, C2 are depicted by way of example) to detect the wave propagation in a piezoelectric actuator encapsulated polymer film. The piezo-actuator 804 is driven by frequencies from 0.5 to 7.0 kHz. The array cantilevers detect the motion at the two points 806, 808 on the film surface 810 simultaneously. FIG. 8B shows the frequency dependent amplitude, and FIG. 8C shows phases of cantilever 1 and cantilever 2, and the phase delay between the two probes.

In addition to mapping tomography and chemical forces of static samples, the AFM array is applicable in a dynamic system, including an ultrasensitive detection of mechanical wave propagation in a soft polymer film. A composite piezo actuator encapsulated in soft eco-flex polymer film may be employed to generate the mechanical wave in 0.5-7.0 kHz frequency range. The film surface fluctuations at two different points about 388 µm apart may be simultaneously monitored by two cantilevers engaged on the film surface. The schematic of the platform and the measured vibration amplitude spectrum are shown in FIGS. 8A and 8B, respectively. The amplitude of the propagating acoustic wave ranges from 0.5 nm to 3.5 nm, with a resonance peak of the radial mode located at about 3 kHz. The amplitude measured from cantilever 2 is smaller than that from cantilever 1, because cantilever 1 is located closer to the actuator and the wave energy is dampened during propagation. In FIG. 8C, the frequency dependent phase delay between the two probes, which is related to the wave propagation speed in the polymer, indicates that the parallel AFM may lead to reliable and flexible applications for detecting mechanical wave propagation along soft polymer films. With sub-nanometer resolution sensitivity, mechanical signatures from many systems, such as mechanical wave propagation during tissue expansions, and wave attenuation and retardation in materials characterization for defects inspection, are conveniently accessed by the array AFM, and will benefit more investigations in future studies.

Intercellular Cooperative Activities

Figure 9:
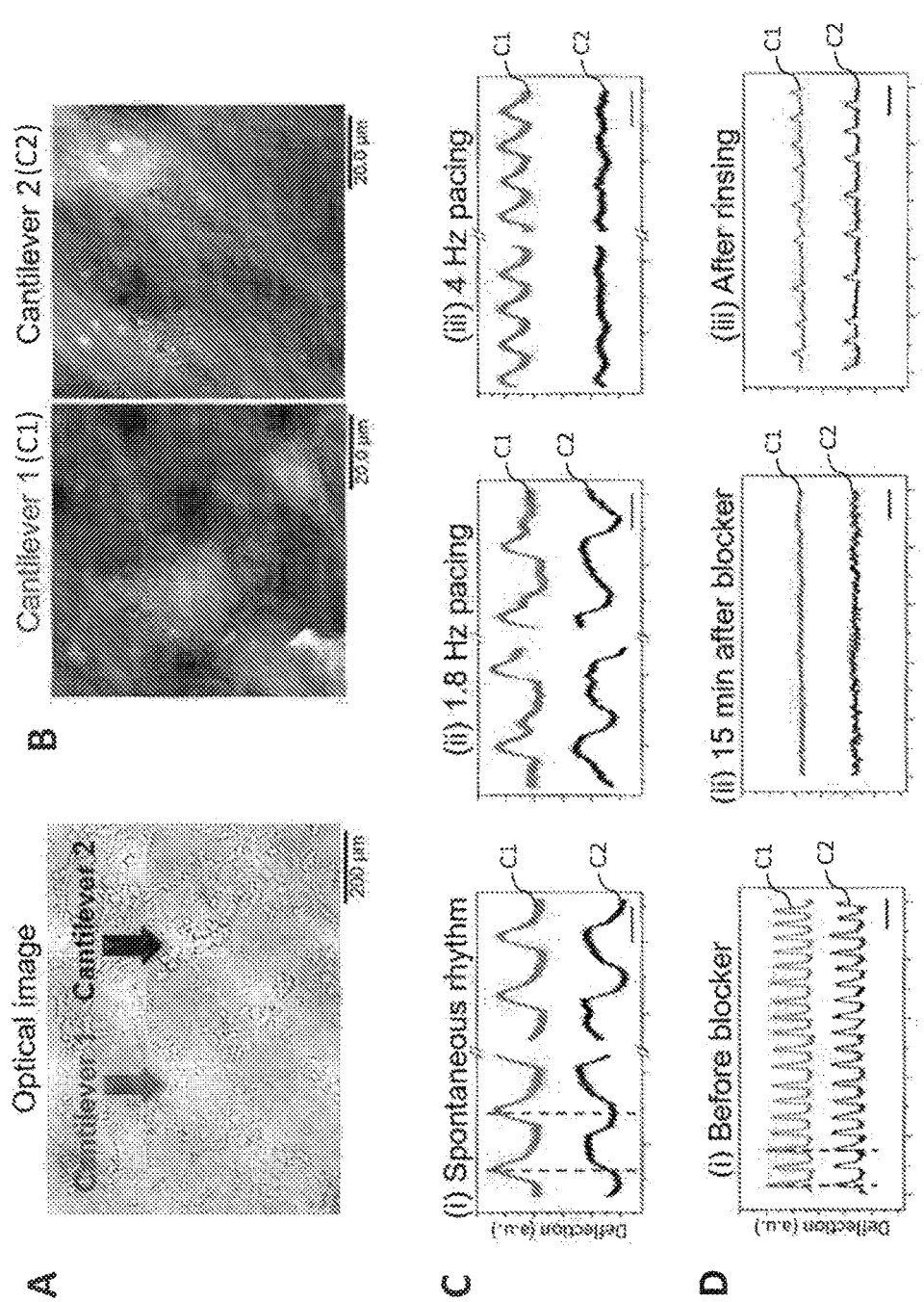
FIG. 9A shows optical image of the live neonatal mouse cardiomyocytes taken by optical microscopy equipped on the SEA-AFM system.
FIG. 9B shows AFM morphology images from two AFM tips of fixed cardiomyocytes in liquid.
FIG. 9C shows simultaneous detection of localized contractile activity of two beating cardiomyocytes during spontaneous beating and pacing at rates 1.8 Hz and 4 Hz.
FIG. 9D shows that gap junction uncoupler heptanol (1 mM) prevents cell-to-cell electrotonic conduction.

FIGS. 9A-9C shows cardiomyocyte coordinated activities detection with SEA-AFM. FIG. 9A shows optical image of the live neonatal mouse cardiomyocytes taken by optical microscopy equipped on the SEA-AFM system. FIG. 9B shows AFM morphology images from two AFM tips of fixed cardiomyocytes in liquid. FIG. 9C shows simultaneous detection of localized contractile activity of two beating cardiomyocytes (C1, C2) during spontaneous beating and pacing at rates 1.8 Hz and 4 Hz. Here, scale bar denotes 250 ms. FIG. 9D shows that gap junction uncoupler heptanol (1 mM) prevents cell-to-cell electrotonic conduction. Output of the photodetector of cantilever 1 (C1) and cantilever 2 (C2) before, 15 minutes after the blocker may be applied and 5 minutes after the blocker being washed away. Here, scale bar denotes 1 s.

FIG. 9A is an optical image showing the potential of the array AFM platform in detecting the coordinated activities of a dynamic biomechanical system. The potential of the array AFM platform may be measured by placing two probes onto a monolayer of neonatal mouse cardiomyocytes. The two morphology images obtained by the two cantilevers are shown in FIG. 9B. Live cardiomyocyte monolayer makes it possible to record cardiomyocyte contractions, when uncoupled and coupled shown in FIGS. 9C and 9D, respectively. With the two AFM cantilevers positioned on two separate cells, simultaneous localized contractile activities and dynamic morphological changes were examined by measuring transverse displacements.

Spontaneous activity from two separate cardiomyocytes (C1, C2) suggests that the two cells were uncoupled: compare the peak to peak distances and overlap between C1 and C2 in FIG. 9C (i) (dotted lines). In the pacing experiments of 1.8 Hz and 4 Hz, the localized contractile activities of the two cells (i.e., changes in cell height with active contraction) are illustrated in FIG. 9C (ii) and (iii). Cell C1 was successfully paced at 4 Hz but C2 could not be paced. These experiments confirm that parallel AFM can be used to study changes in contraction of multiple cells simultaneously.

The array AFM implemented based on some embodiments of the disclosed technology may be used to detect changes in electrical coupling between two coupled cardiomyocytes, as an example of multicellular integrated biological systems. For coupling/uncoupling, heptanol, a gap junction blocker may be used (FIG. 9D). As indicated by dotted lines in FIG. 9D (i), the similar frequency and overlap of contraction suggests the coupling between C1 and C2. Before adding the blocker, the spontaneous contraction frequency of the two cells is synchronous with a measured frequency of about 1.8 Hz. After 15 minutes incubation with 1 mM heptanol, both cells stopped contracting due to the reported effect of gap junction blockers. After washing away the blocker, the two cells resume spontaneous contraction but with reduced contractile response (amplitude reduced) and they become asynchronous. Although the pace of contraction is similar for the two cells, C2 displayed delayed contraction as shown in FIG. 9D (iii), suggesting gap junction function remained compromised.

The above results demonstrate the biological applicability of the SEA-AFM system. This approach expresses advantages over other methods currently in use of its ability to simultaneously measure micromechanical properties of two single cells with high spatial (submicron) and temporal (μs) resolution. Future experiments combining the detection of electrical signals (FIG. 7) with force propagation using multiprobe AFM may decipher essential novel mechanisms with respect to arrhythmogenic pathophysiology.

This patent document discloses a SEA-AFM platform that can achieve simultaneous multipoint nanoscale structure-function analysis both in air and in liquid. The main advantage of the SEA-AFM over other existing array AFM is its ability to optically address closely-packed probe-sample interaction signals without crosstalk or further complexing the system. The versatility and robustness of the SEA-AFM system for multipoint morphology imaging, surface hydrophobicity, and electric potential mapping may be demonstrated. In addition, taking advantage of its high sensitivity and biological compatibility, dynamic mechanical wave propagation in polymer film and intercellular activities of heart cells may be recorded in real-time. A number of innovative implementations can be envisioned from this new array AFM platform, providing new perspectives on the emergent properties in a wide-range of fields, including multipoint manipulations/fabrications, multifunction sensing and robotic cantilever arrays with independent actuators.

Designing Array-AFM to Study Cellular Interactions Mediating Transmission and Progression of AD Pathophysiology in Brain Alzheimer's disease (AD) is the world's leading cause of dementia. In spite of tremendous efforts, no effective treatment is available. Present work will design an array of fully functional atomic force microscope and use them to obtain the first high-resolution dynamic nanoscale structural and functional map of synaptic networks and their changes in response to various amyloids which form membrane pores and their blockers which is essential for our fundamental understanding of biophysical, physiological and pathophysiological mechanisms underlying AD pathology.

AD causes a progressive loss of memory and cognition. In spite of sustained efforts over several decades, we lack the basic understanding of biophysical, physiological and pathophysiological mechanisms underlying AD pathology. Human cognition is controlled by a complex network of cells that are organized in a 3-dimensional architecture and the underlying neurological activity is heavily dependent upon the controlled and coordinated activity of precisely located membrane macromolecules, including channels and receptors. Indeed, cell membrane interactions of various amyloids, including amyloid beta, alpha-synuclein, FTD43 are primary drivers of AD pathophysiology. To obtain a complete understanding of the cellular behavior, technology enabling multi-modal and multi-scale structure-function imaging of live neuronal networks must be created to better understand the integrated neural activities. The structural connectivity and dynamic signal transmission within synaptic networks need to be understood in two fundamental ways: i) structural sub-components, including ion channels and receptors that propagate functional cellular signals and ii) their functional states. Our current understanding of the synaptic structure is limited to electron microscopy (EM) studies in fixed, dehydrated and metal-coated thin sections and which precludes real-time structural changes associated with the synaptic activity and brain function. The functional synaptic activity is currently examined by conventional electrophysiological setup. These studies have yet to elucidate the direct structure-function relationship at either individual synaptic level or at their interconnected clusters. Atomic force microscopy (AFM) allows imaging of native biological specimen in buffer at resolution equivalent to EM imaging and allows real-time introduction of agonists, including chemical, electrical, and mechanical while monitoring neuronal structures. However, current AFM technology is not developed to allow imaging of large areas and is limited to single point imaging and prohibits simultaneous high resolution imaging of connected networks. These connected networks coordinate the behavior of their ion channels to control membrane electrical potentials, producing one of the primary functional outputs of brain cells.

Some embodiments of the disclosed technology provide a novel conducting atomic force microscopy (AFM)-array for simultaneous multi-point imaging with integrated electrical recording. In studying networks in cultured neurons, various embodiments of the disclosed technology may be used to develop arrays of conducting AFM capable of imaging biological structures, image live cultured neurons and synaptic networks, and image structural and functional changes in response to various oligomeric amyloids, including amyloid beta, alpha-synuclein, FTD43 as well as amyloid ion channel blockers implemented based on an embodiment of the disclosed technology to control memory loss in animals. Various embodiments of the disclosed technology can provide high-resolution imaging and increased understanding of synaptic networks linked with neurodegeneration and mental illness, especially AD.

Human cognition is mediated by coordinated activity of neuronal networks, which in turn is dependent upon the controlled activity of proteins and macromolecular constituents in the cell membranes. Indeed, cell membrane interactions of various amyloids, including amyloid beta, alpha-synuclein, FTD43 are primarily the drivers of AD pathophysiology. In the case of AD, extracellular plaques and intracellular neurofibrillary tangles, as well as fewer synapses and neurons are found in the brains of AD patients. The plaques and tangles are composed of β-sheet fibrils, known as amyloid fibrils with AP peptides and Tau proteins as their main components, respectively. Amyloid plaques may be presumed to be the main cause of the disease but recent studies show poor correlation of the severity of AD with the density and localization of amyloid plaques. The focus of AD research has now moved to the study of small oligomeric species of Aβ peptides and increasing evidences report that AP oligomers show more toxicity. Prevailing mechanism of AD pathology postulates that Aβ oligomers negatively affect neuronal function and survival by forming ion permeable pores, resulting in the destabilization of cell ionic homeostasis. Others major hypothesis suggest that amyloid-mediated increase in oxidative stress causes the toxic cascade that leads to cell loss. To obtain a full understanding of this behavior, enabling technology that allows for multiscale imaging of live networks must be created to better understand the structure-function relationship of neural pathways.

The human brain is composed of different subunit cells that form complex connected pathways for signal transmission, memory, and system level control. The fundamental communication and control subunits of this network include a wide range of cell morphologies and functionalities dependent upon anatomical location. In the brain, along with neurons, are a large number of glial cells that help support the function of neurons through oxygenation, insulation, rearrangement of cells, as wells as some functional roles in signal transmission. These, and other cells, give the ability to transmit and store data as well as control systemic function. Signal transmission in neuronal networks relies on a robust combination of electrical and chemical stimuli to efficiently compute and control many parallel tasks, while operating with very low power consumption.

The structure of the brain has been widely studied in macroscopic viewpoints, contributing insight into how the various regions of the brain contribute to different tasks. Advancing techniques for the study of neurons have provided insight in electro-chemical actions and operations in various brain functions, including visual, olfactory, motor-control and memory. Optogenetic circuits have allowed for localized control for triggering of neuron firing to further understanding of cellular connectivity. Chemical cues, such as neurotransmitters and regulated local ionic concentrations have been shown to be important for enhancing and stimulating neuronal activity adding another layer of complexity to synaptic networks. Furthermore, the rate and repeating of signal spikes can alter the signaling pathway driving cellular behavior. These communication cascades, both electrical and chemical, act upon the proteins that are present in cell membranes by altering their conformation.

The proteins present in the membranes of neuronal cells include receptors and ion channels (voltage gated, ligand gated, and ion gated), that alter their conformation leading to depolarization of the cell as well as transmission down axons. This complex organization scheme is further convoluted by the multi-input and output connectivity of neurons, when multiple neurons synapse upon a single neuron or when a single neuron forms synapses with multiple other neurons. This super-organization and robustness in the brain allows multiple activities for neuronal communications through a number of pathways. Understanding the fundamental nature of neural function requires complete understanding of the complex structure and activity in a parallel and simultaneous fashion.

Figure 10:
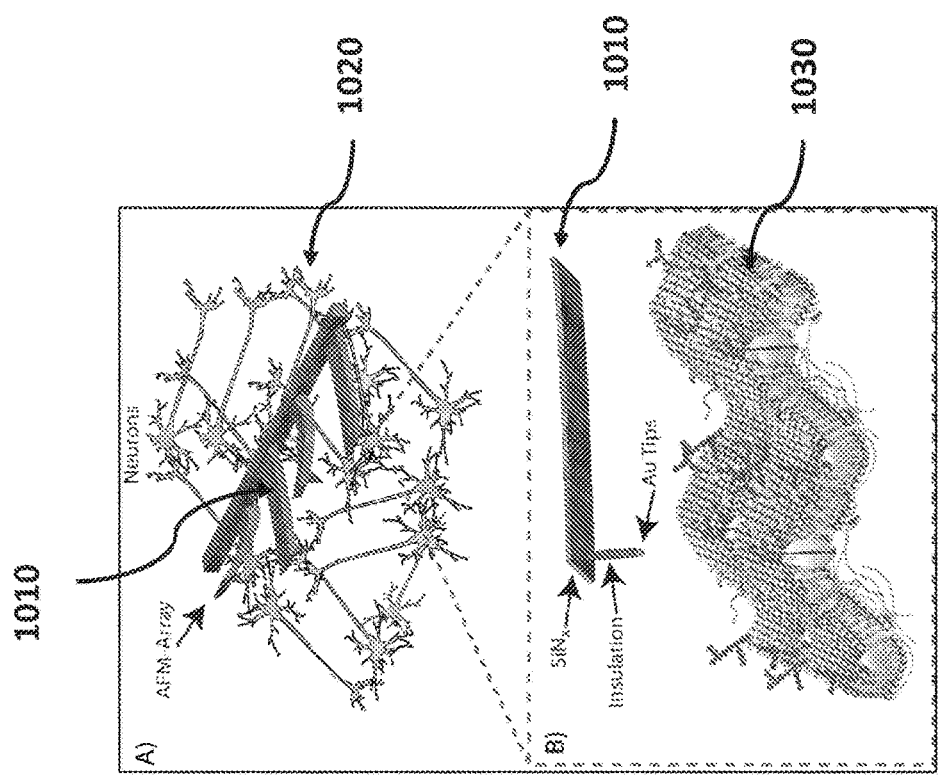
FIG. 10A shows a schematic of independent cantilevers imaging a synaptic network.
FIG. 10B shows a zoom-in of an AFM cantilever with a high aspect-ratio conducting tip.

Much progress has been made to understand the computational complexity of brain network. Indeed, large simulations and experiments have demonstrated the important role of synaptic networks, individual neurons and proteins in facilitating communication and signal transmission. Our current understanding of individual proteins and larger structures in the brain is based upon non-optimal imaging by x-ray diffraction and electron and light microscopies. To best understand the brain complexity, technology capable of imaging dynamic structures in fluidic environment is required as the expression of proteins as well as the structures change over time in response to chemical and physical cues FIG. 10A shows a schematic of cantilever array including a plurality of independent cantilevers 1010 imaging a synaptic network 1020, and FIG. 10B shows a zoom-in of an AFM cantilever 1010 with a high aspect-ratio conducting tip. Atomic force microscopy (AFM) is a necessary tool for high-resolution structural imaging of nanostructures 1030. Since the first imaging of the tertiary structure of gap junction ion channels, the performance and functionality of AFM continue to expand.

AFM has been used to image cytoskeletal networks, ion channels, including nicotinic acetylcholine receptors, porin channels, rhodopsins, and many receptors. Unlike other high resolution imaging techniques (e.g., NMR, EM, and x-ray diffraction), AFM is the only technique that can provide structural detail of active molecules in real time under physiological conditions. This enables specific responses of proteins, i.e. conformational changes or ligand binding, to be observed in real time.

AFM has been used as a sensor for a wide range of applications including pH, ions, and electrochemistry. Significantly, functional data can be obtained along with high-resolution topographic imaging. AFM may be utilized to examine the topographic structure of nanopores and their ionic conductance. AFM imaging may also be combined with other techniques including, patch clamp, fluorescent microscopy, and total internal reflectance microscopy, to enhance the imaging modalities.

Various embodiments of the disclosed technology provide tools for understanding how the brain operates in terms of structure and function of neuronal network associated with AD pathology through the creation of novel nanotechnology and will enable high throughput multipoint imaging of synaptic networks while providing simultaneous functional recording. Various embodiments of the disclosed technology can be applied to answer a spectrum of other neuroscience problems as it will allow micro-to-nano imaging of cellular structures and proteins on the surface of neuronal cells in a physiologically active environment.

A complex system, such as the brain, needs to be understood through the correlative study of both the structure and functional activity of the cellular network. Understanding such a system requires the development of novel technology that is able to image across multiple scales in an active environment. Studying structures of cellular network at the nanoscale (down to 5-10 nm) with high throughput capability involves the development of precise and highly parallel imaging with simultaneous electrical recording.

Some embodiments of the disclosed technology may be used to demonstrate imaging of receptors on live cells as well as imaging of ion channels in an active environment, such as purified membrane fragments and reconstituted in lipid bilayers. Some embodiments of the disclosed technology may be used to improve our current nano-bio techniques by 1) creating a multiple AFM imaging probe for parallel high resolution imaging, 2) gathering simultaneous structural and functional information through the development of conducting AFM tips, 3) applying this system to map brain sections in active environments, and 4) examine the effect of various AD associated amyloids, including amyloid beta, alpha-synuclein and FTD43 on neuronal structures and activity. The innovation of this system is described in detail below.

Some embodiments of the disclosed technology include self-sensing, self-actuating arrays of cantilevers capable of imaging biological structures. AFM allows high-resolution imaging of proteins and cellular structures in a physiologically active environment. However, currently it has a limited scan size at a given time. Even with high-speed systems currently available, the throughput is much slower and the scan size is even smaller (only a few tens of nanometers). Adding parallelization to this system by increasing the effective imaging area will increase the amount of data that can be collected with AFM.

Figure 11:
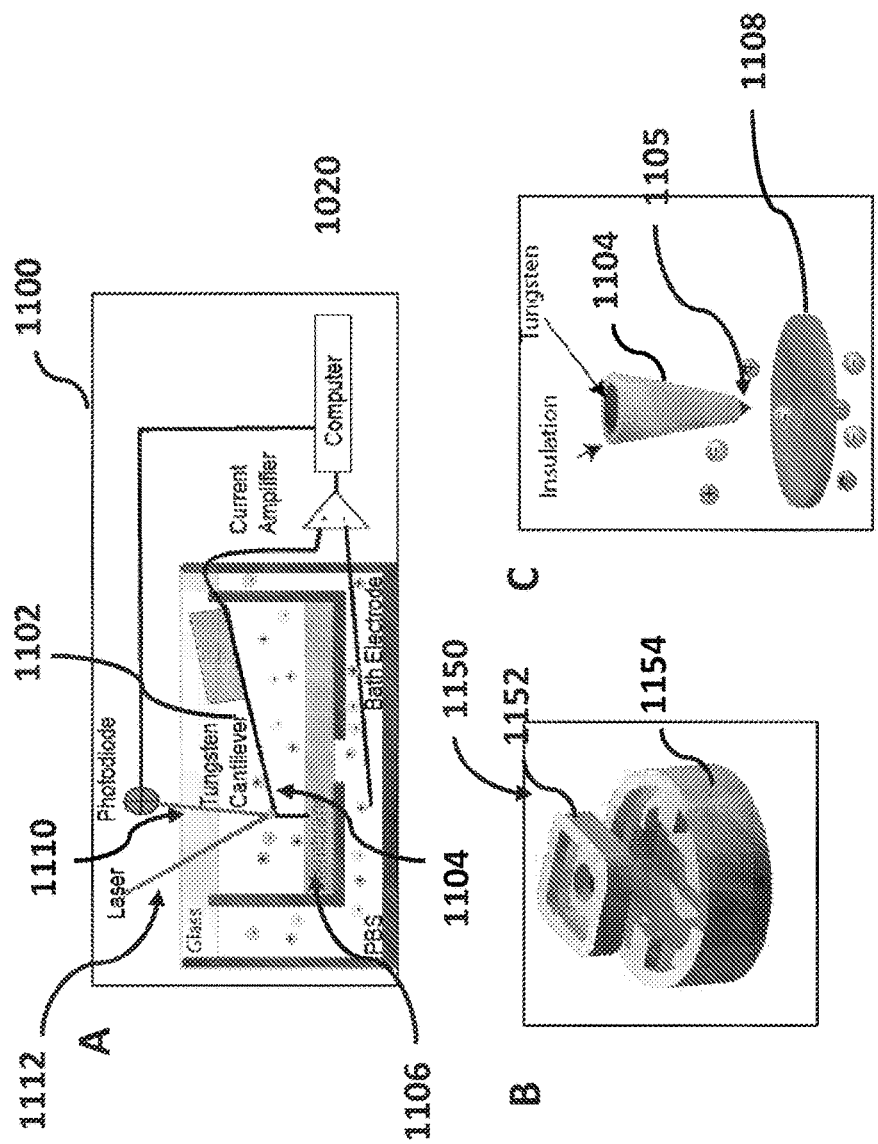
FIG. 11A is a schematic of the system used.
FIG. 11B shows a rendering of two-chamber AFM that allows ionic current to be measured through pores connecting the top and bottom chambers.
FIG. 11C shows a cross-section of the micro-wire that is insulated such that on the tip apex is exposed.

FIGS. 11A-11C show a schematic of an example SEA-AFM system 1100 including a plurality of conducting AFM cantilevers 1102 (only one tungsten cantilever is depicted by way of example) using conducting micro-wires. Specifically, FIG. 11A is a schematic of the system used, FIG. 11B shows a rendering of two-chamber AFM 1150 that allows ionic current to be measured through pores connecting the top 1152 and bottom chambers 1154, and FIG. 11C shows a cross-section of the micro-wire that is insulated such that on the tip apex 1105 is exposed.

As shown in FIG. 11A, a cantilever array includes a plurality of cantilevers 1102 each of which includes a tip 1104 insulated with insulation materials formed on its surface and structured to detect a sample 1106, 1108 and configured to deflect the different dispersed light beams 1110 by moving in position based on an interaction with the sample 1106, 1108 to produce multiple deflected output beams 1112 at different output optical wavelengths from the cantilevers.

The AFM-array implemented based on an embodiment of the disclosed technology may include multiple cantilevers capable of imaging structures and functions simultaneously and independently. Parallel AFM may have limited resolution, and may not be equipped to work in a liquid environment and thus have limited application for studying biomolecules. The SEA-AFM system implemented based on some embodiments of the disclosed technology, however, can meet the needs of the biological community, with a special focus on neuroscience. In one example, multiple cantilever based AFM implemented based on an embodiment of the disclosed technology may have self-actuation and self-sensing capabilities. Traditional AFM relies on a piezostack to adjust the height of the cantilever relative to the surface to maintain a constant force interaction as measured by the cantilever deflection. The AFM design implemented based on various embodiments of the disclosed technology includes fabricating actuators on each cantilever capable of altering the deflection to maintain a constant interaction force between cantilever tip and the sample. In addition, a sensor will be present at the base of each cantilever to measure the deflection or vibration of the probe. Utilizing this probe-based approach will allow for each cantilever act as its own independent microscope.

Recent tools to study neuronal networks such as optogenetic circuits and micro-electrode arrays have enhanced our understanding of functional cellular activity underlying brain activity, but are unable to provide structural and functional information regarding the activity of the proteins that ultimately control this behavior. Structural tools have either low resolution (e.g. MRI), or cannot be combined with simultaneous functional recording (NMR, EM, x-ray crystallography). The system with AFM-array implemented based on some embodiments of the disclosed technology has the ability to image structure with high resolution (<10 nm), which is currently not available technique. In one example, the AFM-array can be integrated with optogenetic and micro-electrode arrays. The system with AFM-array may be combined with multiple optical techniques as well as use with electrode arrays, making it very versatile.

Once the techniques for fabrication and testing of structures is completed and tuned, the number of AFM cantilevers can be increased considerably. This will 1) increase the number of data points that can be acquired simultaneously (high throughput) and 2) increase the overall area being imaged. This can be accomplished by controlling each cantilever individually and allowing for independent sensing from each probes and independent actuation allowing for real-time positioning and modulation of the interaction force during imaging. The technology being disclosed here includes probe development that is designed to interface with nearly any atomic force microscopes with minimal upgrades.

Some embodiments of the disclosed technology include a conducting AFM probe for simultaneous collection of structural and functional information. Due to the intrinsic relationship between structure and function, a technology that can measure both of the information simultaneously will provide the most insight into their interplay. Most AFM cantilevers are not capable of measuring localized electrical currents in an aqueous environment. Creating conducting probes for highly localized electrical recording is thus an important problem in the development of AFM and other scanning probe microscopies. Some embodiments of the disclosed technology may be used to develop micro-fabricated methods for creating probes for measuring localized electrical activity.

A limitation of present recording systems is the inability to position/reposition the probe in desired areas. An AFM array with conducting probes may facilitate this ability. Having conducting cantilevers with controllable z positioning will result a powerful electrical recording tool for studying neuronal synaptic networks. This will allow a precise control of the depth at which the probe is placed.

Various embodiments of the disclosed technology may allow high resolution study of the structures present in functional synaptic networks that will require neuronal structures to be imaged in a physiologically relevant environment. The dynamics of the proteins present in the membranes involve changes in their conformation, as well as the changes in expression levels of proteins in response to the release of different neurotransmitters and electrical pulses. Imaging in this dynamic environment will improve understanding of the structures and how they respond to these cues, compared to stagnant structures seen in fixed samples.

Imaging of neuronal structures is not an innovative idea as this has been accomplished many times. However, simultaneous images acquired with high resolution, and coupled with functional data is novel. No other approach will allow for such a breadth of data to be acquired simultaneously.

Various embodiments of the disclosed technology may be implemented by i) designing AFM-arrays for simultaneous multipoint imaging of high resolution structures, ii) functional recording with a conducting AFM probe that has a controllable independent z positioning electrode, and iii) improved imaging of neurons and live neuronal network in an active environment. Unlike research on high-resolution structures using techniques such as EM, various embodiments of the disclosed technology may perform the imaging in a dynamic environment, while improving on the limitation of AFM.

Some embodiments of the disclosed technology may be used to image protein structures under physiological environment, including imaging protein structures at high resolution in cellular membranes with a focus on those present at the synaptic junction. A track record of imaging proteins may be demonstrated using the AFM implemented based on some embodiments of the disclosed technology at high resolution in active and quasi-active environments. The possible research in the structure of proteins using the disclosed technology may include not only the areas of high-resolution studies membrane proteins, such as ion channels and receptors, but also research in living cells, purified membrane fragments, and reconstituted in bilayers.

In performing AFM imaging of ion channels, high resolution images of ion channels, acetylcholine receptors and connexin hemichannels may be obtained. The high-resolution structures may be achieved through AFM in an active environment, including open and closed conformations of Cx43 structures through the addition of calcium and subsequent removal of calcium from the system. In addition, the AFM implemented based on some embodiments of the disclosed technology may be used for imaging of live cell receptors, including demonstrating the presence of receptors on the surface of live cells detected with AFM.

Figure 12:
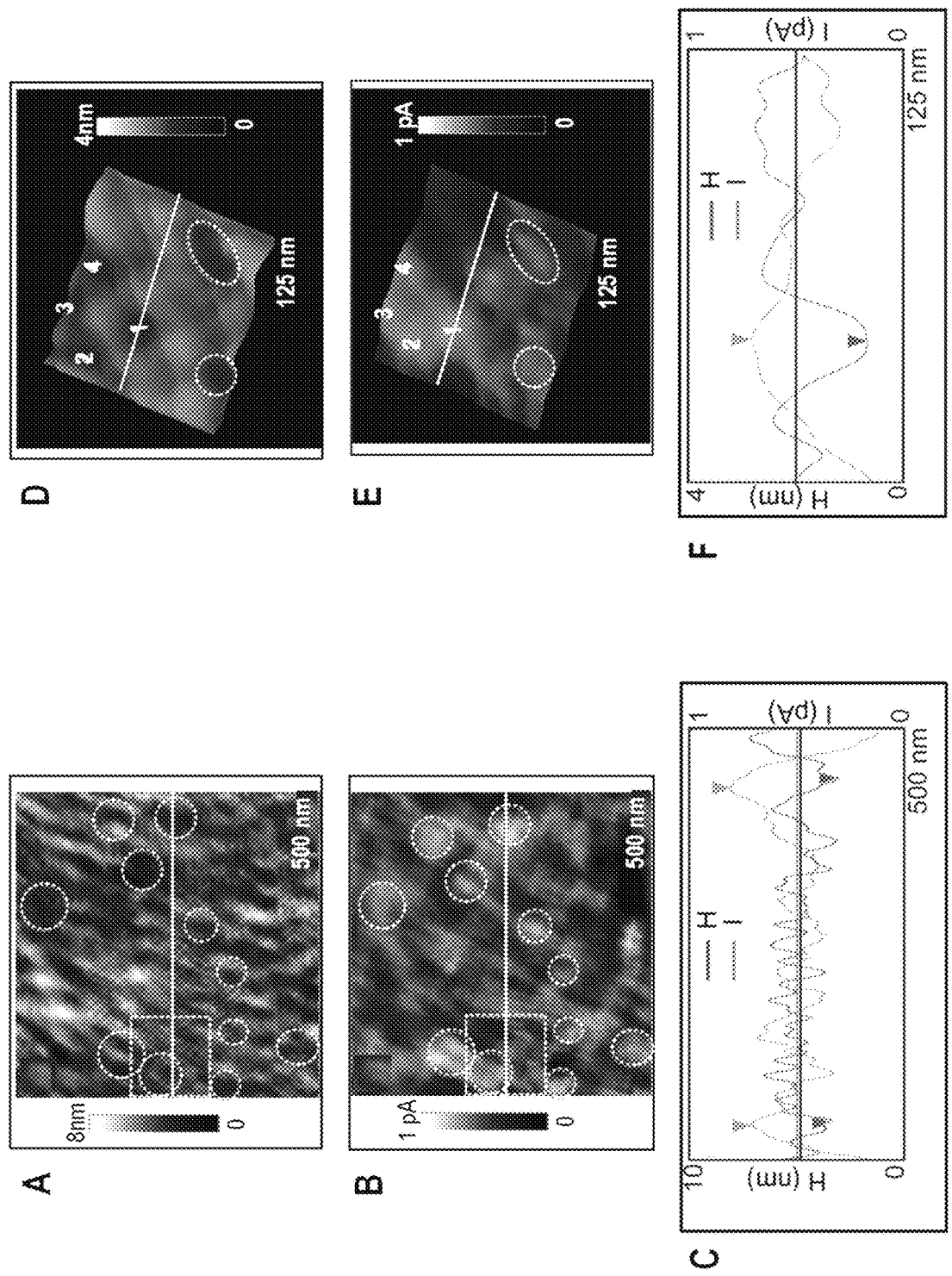
FIG. 12A shows an image of 20 nm pores in an aluminum oxide membrane.
FIG. 12B shows conductance image of the same membrane recorded simultaneously.
FIG. 12C shows traces of the height profile and ionic current.
FIGS. 12D and 12E show zoomed images of select regions.
FIG. 12F shows profiles within the zoomed regions.

FIG. 12A-12F show simultaneous imaging of surface topography and ionic current. FIG. 12A shows an image of 20 nm pores in an aluminum oxide membrane. FIG. 12B shows conductance image of the same membrane recorded simultaneously. FIG. 12C shows traces of the height profile and ionic current. FIGS. 12D and 12E show zoomed images of select regions. FIG. 12F shows profiles within the zoomed regions.

Some embodiments of the disclosed technology may be used for correlative structure-function studies of ion channels and cells. As part of the goal of imaging simultaneous structure-function of synaptic networks, recording localized electrical current is important. For example, the black lipid membrane technique and AFM may be used to study ion conducting properties of amyloid ion channels. In order to get correlative structures and functions of ion channels, disclosed AFM platforms may simultaneously monitor multiple aspects of the aspects of the biological samples, including simultaneously monitor fluorescent signals and image. In some embodiments of the disclosed technology, the conducting AFM probes with insulating layers coated on cantilevers that are designed for operation in fluid may be used as shown in FIGS. 11A-11C. The disclosed technology makes it possible to record localized ionic currents through nanopores while simultaneously recording surface topography as shown in FIGS. 12A-12F. We have previously accomplished this by using glass pipettes, but recently have developed a conducting AFM probe made of tungsten micro wires with insulating coatings.

Figure 13:
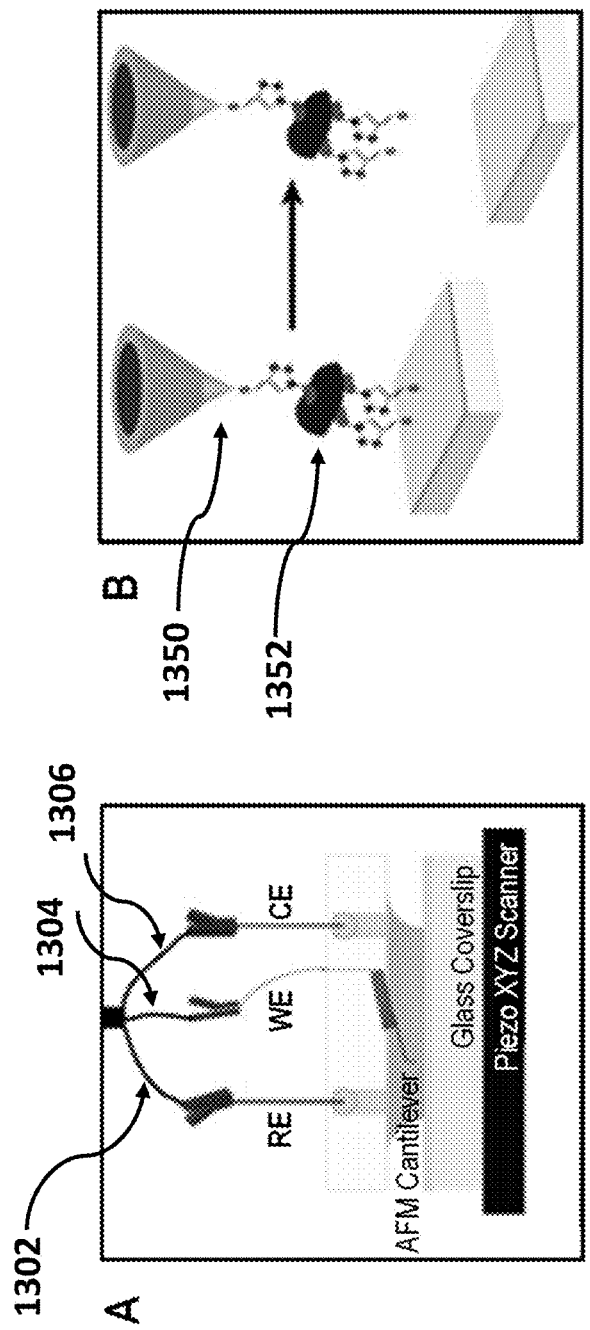
FIG. 13A shows a schematic of electrochemical (EC)-AFM setup, where "RE" indicate a reference electrode, "WE" indicates a working electrode, and "CE" indicates a counter electrode, and all the electrodes may be made of Ag/AgCl, Au, and platinum, respectively.
FIG. 13B shows sequence of operations in order to lift a single bacterium off the surface using an AFM gold coated tip.

FIG. 13A shows a schematic of electrochemical (EC)-AFM system including a reference electrode 1302, a working electrode 1304, and a counter electrode 1306, where "RE" indicate a reference electrode, "WE" indicates a working electrode, and "CE" indicates a counter electrode, and all the electrodes may be made of Ag/AgCl, Au, and platinum, respectively. FIG. 13B shows sequence of operations in order to lift a single bacterium off the surface using an AFM gold coated tip 1350. A detailed understanding of electron transfer processes from enzyme 1352 to electrodes 1302, 1304, 1306 may be obtained using a conductive AFM tip 1350 with an insulator coating around the area except the tip end. The EC-AFM setup implemented based on an embodiment of the disclosed technology may show the surface coverage of the electrode and, by imaging a single bacterium, calculate the number of surface displayed redox enzymes. This ensures our capability of making multiple conductive AFM probes that are only exposed at the tip end. Insulating coating around the tip will allow us to measure only local ionic current from cell membranes.

Figure 14:
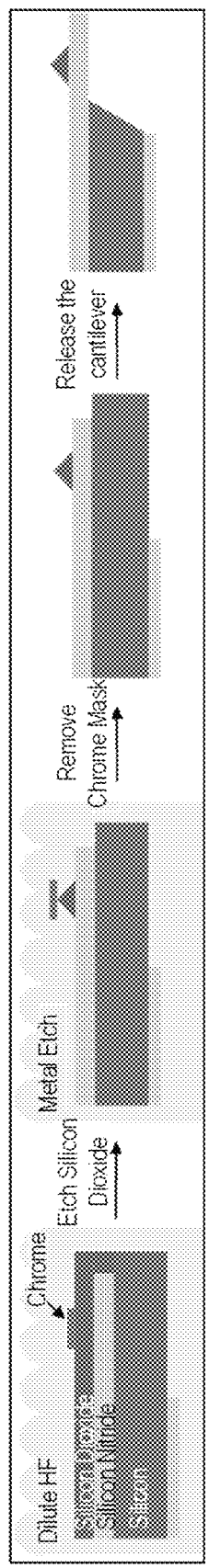
FIG. 14 shows an example fabrication method of cantilever tips made of silicon dioxide.

FIG. 14 shows an example fabrication method of cantilever tips made of silicon dioxide. In some embodiments of the disclosed technology, an array of cantilevers with actuators for imaging biological structures may be used to fabricate the AFM-array with conducting probes that can be scaled up for arrays with an increased number of cantilevers, allowing highly parallel imaging. For that end, three necessary components must be fabricated to have a fully independent cantilever imaging: 1) A micro-fabricated cantilever with a spring constant soft enough for biological samples and a tip sharp enough for imaging high resolution nanoscale structures, 2) a multicolor optical system for parallel imaging from each cantilever, and 3) an independent actuator present on individual cantilevers that can independently adjust z-position of each cantilever to maintain the applied imaging force. The benefit of this approach is that all three of these components can be optimized independently and tested in parallel research steps before combining to create a final product. Advances in self-sensing cantilevers may enable improved resolution and operation in fluid.

In an embodiment of the disclosed technology, cantilever-array for mapping biological structures and functions simultaneously may be fabricated. When imaging the structure of soft materials, such as those in biological systems, with an AFM, low contact forces should be applied to prevent any deformation of the sample or artifact. An AFM system implemented based on an embodiment of the disclosed technology may include multiple cantilevers that have a low spring constant (<0.1 N/m) that is sufficient for imaging cellular membranes without damaging the cell. In addition to the soft cantilever, the AFM system may probe with a tip radius of 10 nm for high resolution imaging on non-crystalline surface, and will be able to get 5-10 nm lateral resolution for any structural changes and examine the role of amyloid ion channels on their structures. Since the AFM cantilever implemented based on some embodiments of the disclosed technology may have additional actuators and sensing added to the system, it is important to give special attention to the fabrication to ensure the cantilevers are suitable for imaging such biological samples.

The fabrication process of the AFM system may include fabricating parallel cantilevers and scaling up to larger arrays (e.g., 5×5). This approach allows us to focus on creating simple multiple probes while reducing the early stage complexity of the fabrication. Once the fabrication process is optimized and established, larger arrays will be easily fabricated. The details of how we plan to accomplish this are given below:

Independent actuation of each cantilever insures the imaging force at each imaging point to be the same regardless of the different topographies. This independent actuation will decrease any damage to biological samples but will improve the resolution of sample topography. This task may be accomplished by integrating voltage sensitive actuators on each cantilever that allow for independent control of each cantilever. This requires the use of precise and controlled fabrication techniques to produce high quality, consistent, and responsive films to maximize the amount of deflection that can be applied to each of the cantilever.

In addition, cantilevers will be insulated to prevent fluid and salt damage of the piezo-stack as well as extraneous voltage sources that could influence the behavior of neurons and trigger undesired events. Insufficient insulation would allow rapid decrease in the cantilever motion in response to an applied voltage. This is due to current leaks through the film or corrosion of piezoelectric materials and electrical contacts.

The cantilevers may be fabricated as low stress SiNx deposited on silicon wafers. This may prevent self-deflection of the cantilevers due to the thermal stress when the Silicon is removed. The shaping of the cantilevers may be done through a dry etching process of the SiNx in an isotropic fashion. The silicon underneath the cantilever is then removed through anisotropic wet etching using a warm KOH solution, as shown in FIG. 14.

In order to fabricate a sharp imaging tip, a layer of SiO2 may be deposited on the cantilever through chemical vapor deposition. The SiO2 may be etched away in HF solution while the AFM tips are protected by a chrome mask on the surface. Further sharpening of the tips can be performed by using dry etching techniques as necessary.

FIG. 15A shows a schematic of actuation fabrication layers 1502, 1504, 1506, 1508, 1510 for a piezo film. FIG. 15B shows an assembled piezo-stack 1520. FIG. 15C shows an example of different positions for each cantilever 1530 achieved through independent actuation.

As shown in FIG. 15A, in some implementations, the actuation fabrication layers for the piezo film may include a first gold layer 1502, a first silicon oxide layer 1504, a piezo film layer 1506, a second silicon oxide layer 1508, and a second gold layer 1510. As shown in FIG. 15B, the first gold layer 1502, the first silicon oxide layer 1504, the piezo film layer 1506, the second silicon oxide layer 1508, and the second gold layer 1510 are assembled to form a piezo-stack 1520.

In the fabrication process of actuators, piezoelectric ceramics may be used to design actuators. Ceramics can be sputtered onto a surface and subsequently etched into the desired shape. A ZnO ceramic may be utilized such that it is sandwiched between two electrodes with a thin insulating coating. Such actuators have the ability to deform cantilever objects on the order of µm.

Figure 15:
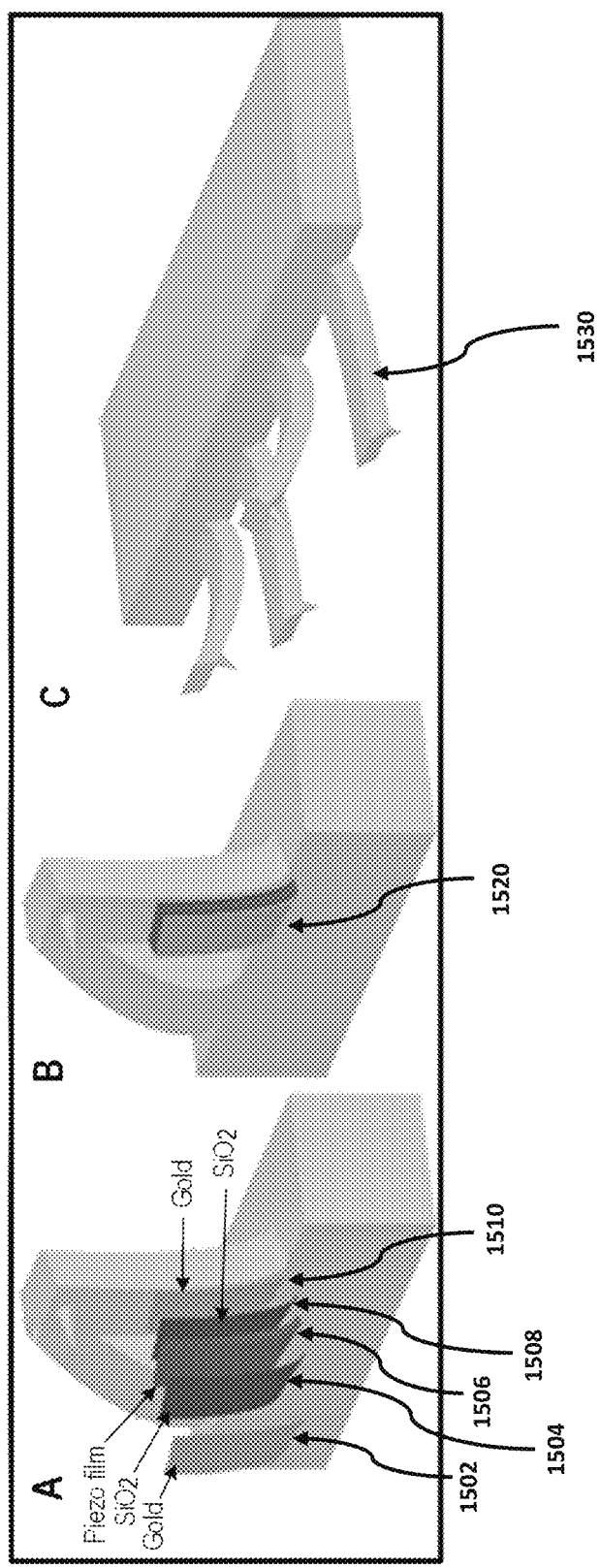
FIG. 15A shows a schematic of actuation fabrication layers for a piezo film.
FIG. 15B shows an assembled piezo-stack.
FIG. 15C shows an example of different positions for each cantilever achieved through independent actuation.

Insulation of the piezo-stack from fluids may be accomplished in 2 phases, including a first phase involving the use of CVD nitride on the cantilever, which has a proven track record of withstanding fluid and salt penetration for several hours, and a second phase involving an additional conformal parylene coating, which will be introduced to further prevent decay of the piezo-stack, as shown in FIG. 15.

A capacitive detector set up can be used for the calibration of the sensing and actuating mechanisms. Altering the distance of the probes from the cantilever surface allows for voltage and distance curves to be generated for interpreting the height measurements.

Figure 16:
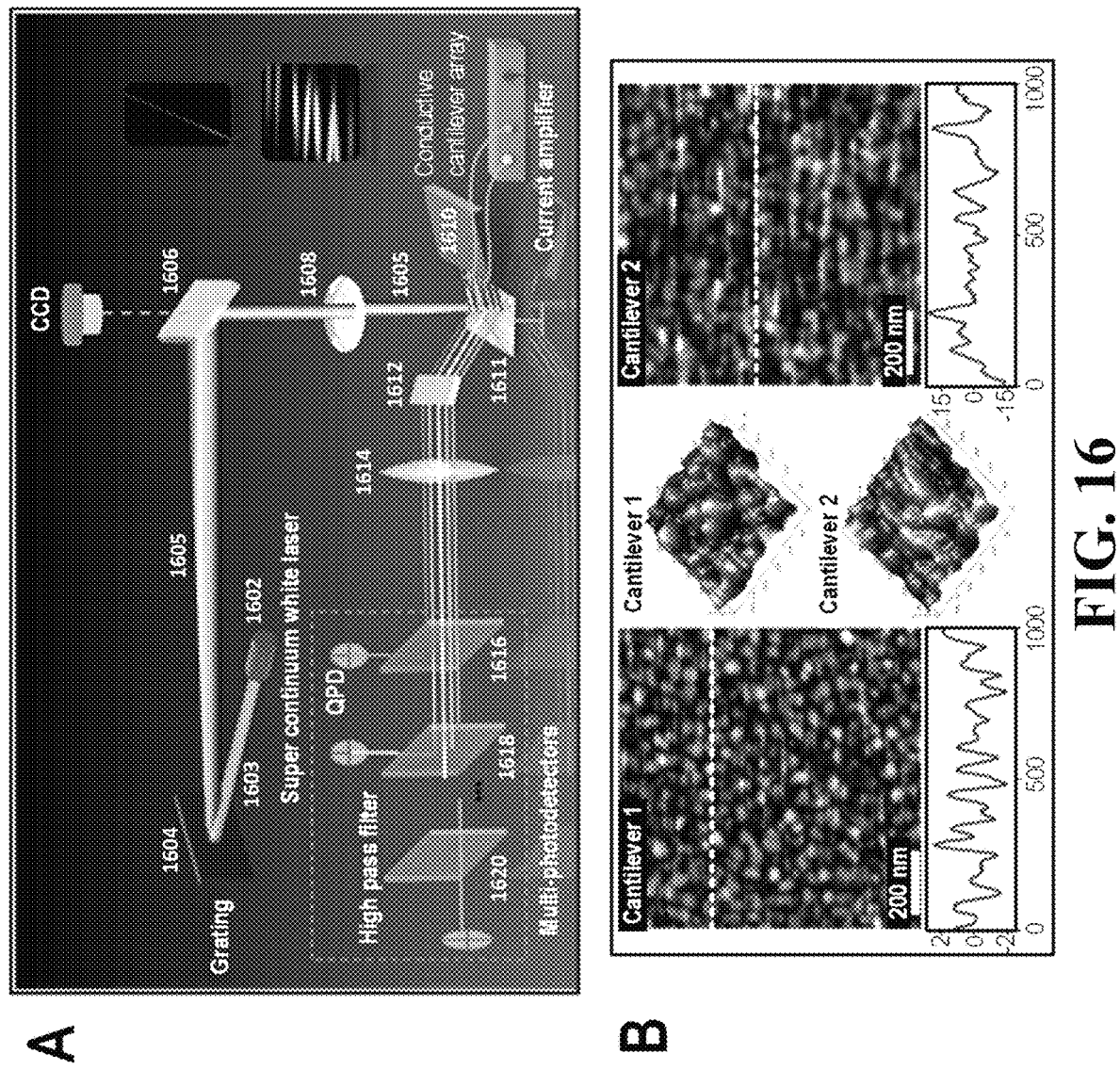
FIG. 16A shows schematics of multicolor optical system for multi AFM cantilever system.
FIG. 16B shows AFM images of gold nanoparticles (30 nm in diameter) using two parallel cantilevers.

In some embodiments of the disclosed technology, soft cantilevers that are capable of imaging biological samples may be used. These multiple cantilevers may be used in conjunction with traditional AFM feedback and control system to image samples of interest. An array of cantilever 5×5 may be fabricated for utilizing in neuroscience applications. In some embodiments, piezo-electric films may be deposited on each individual cantilever. Cantilever may have sufficient isolation of the piezo-films to prevent deterioration of the actuators to allow them to last more than 12 hours of imaging time. The cantilevers may have sub-nm motion accuracy to measure the topography of membrane proteins When the tip is not sharp enough for imaging the sample topography, this may cause the probe insufficient access to the surface due to the surface having rapid changes in the surface topography. Alternatively, the probe tip can be fabricated by growing silicon nanowire at the end of the cantilever via a chemical vapor deposition process. This may result in a sharp imaging tip with a high aspect ratio. If ZnO films prove to be low quality for actuation, more complex films such as PZT can be utilized for the actuator which have high quality responses but are more difficult to fabricate. Additionally, thermal actuation could be pursued as an alternative solution. Fluid may leak into the piezo-stack actuators damaging the controls. This can further be reduced by increasing the quality of the nitride film through annealing of the film. Other options include examining hydrophobic conformal polymer materials or electrophoretic paints to fill any gaps in the insulating films FIG. 16A shows schematics of multicolor optical system for multi AFM cantilever system. Super continuum white laser goes to the grating that spread the white laser to multicolor. Each color of laser can be aligned to the each of multi cantilevers. Deflection of cantilevers is detected by corresponding quadruple photodetector then to the feedback loop of AFM controller. Other wavelengths of lasers are filtered by using high pass filter. FIG. 16B shows AFM images of gold nanoparticles (30 nm in diameter) using two parallel cantilevers. Here, scale bar is 200 nm. Cross sections from the dotted lines on the AFM images are drawn below each image showing the nano particle diameter of 30 nm.

As shown in FIG. 16A, the multi AFM cantilever system based on some embodiments of the disclosed technology includes a laser source 1602 (e.g., a supercontinuum laser) to produce laser beams 1603, which are reflected by a grating 1604 and propagate through a mirror 1606 and a focusing lens 1608 and projects a spectral gradient 1605 onto a cantilever array 1610. Each cantilever of the cantilever array 1610 is illuminated by light 1605 with distinct wavelength. the multi AFM cantilever system based on some embodiments of the disclosed technology also includes a plurality of photodetectors 1616, 1618 to receive multiple deflected output beams 1611 of different wavelengths from the cantilevers of the cantilever array 1610, respectively. Each photodetector 1616, 1618 is operable to detect a change in direction or position of each received deflected output beam. In addition, a high pass filter 1620 can be coupled to an output terminal of the photodetectors 1616, 1618 to regulate output signals of the photodetectors 1616, 1618.

Some embodiments of the disclosed technology provide robust multicolor optical systems for parallel imaging from each cantilever. AFM is the most promising candidate in that its resolution can reach to a few nanometers easily which enables us to look at nanoscale behaviors. Especially, capability of AFM measurement in a solution shows great insights in biological system. One of the drawbacks of AFM is relatively slow imaging speed because of intrinsic raster scanning mechanism. Various efforts have been directed toward to increasing the speed of AFM imaging and the speed is fast enough to look at walking myosins. However, when it comes to multiple samples, a serial measurement process is inevitable and usually takes a long time.

In parallel with the fabrication of multiple cantilevers, this patent document also discloses a detecting system that can independently collect signals from each cantilever, including a multicolor optical system that uses a white laser spreading into different wavelengths of laser lights after reflecting from an optical diffraction grating. Each wavelength of light is reflected from the diffraction grating along a path that follows a specific angle and these paths can be aligned on multiple cantilevers, as shown in FIG. 16A. Since each color of laser can be aligned to each cantilever, the laser reflection from each cantilever can be collected separately to detectors. Various embodiments of the disclosed technology minimize the use of optical setup and many other lasing components. In addition, using this multiple color laser will be a great advantage because it prevents any cross talks come from using same wavelength laser. The AFM array system implemented based on some embodiments of the disclosed technology can image gold nanoparticles with a diameter of 30 nm using two parallel AFM probe, as shown in FIG. 16B. The system may be optimized to obtain more stability and to reduce any noises. The AFM array system implemented based on some embodiments of the disclosed technology may have an ability to multipoint record high resolution structure (<10 nm) while providing functional data (electrical and chemical activity), which no other currently available technique can. Importantly, the AFM-array can be integrated with chemical modification and microelectrode arrays.

By further functionalizing the probes with octadecyltrichlorosilane OTS), a multi-cantilever AFM system using multicolor lasers mentioned above may achieve simultaneously imaging and hydrophobicity mapping on patterned samples (See FIGS. 6A-6H). Besides, based on the ideal mechanical force detecting sensitivity, the parallel AFM system implemented based on some embodiments of the disclosed technology may be used to study the dynamic micromechanical properties of the cultured rat cardiomyocyte cell and its reaction to gap junction uncouple heptanol as shown in FIGS. 9A-9D. The beating frequency of 1.8 Hz and 4 Hz may be recorded from each cantilever positioned on the cardiomyocyte cells. This heterogenous beating frequency of the cardiomyocyte cells may be averaged if conventional methods were used. Furthermore, the effect of a gap junction block, heptanol, may be used to block the beating and the beating of the cell stopped after 15 min of incubation. This Array AFM using multi-cantilevers may be used to verify correlative structures and activities of amyloid ion channels and will give insight in designing therapeutic regimes and help finding ultimate therapeutic drug molecules. Although some embodiments may be described with a range of amyloids and their ability to form ion channels by reconstruction in lipid bilayers by way of example, it may be appreciated that the proposed techniques would be suitable for other ion channel targets as well.

Figure 17:
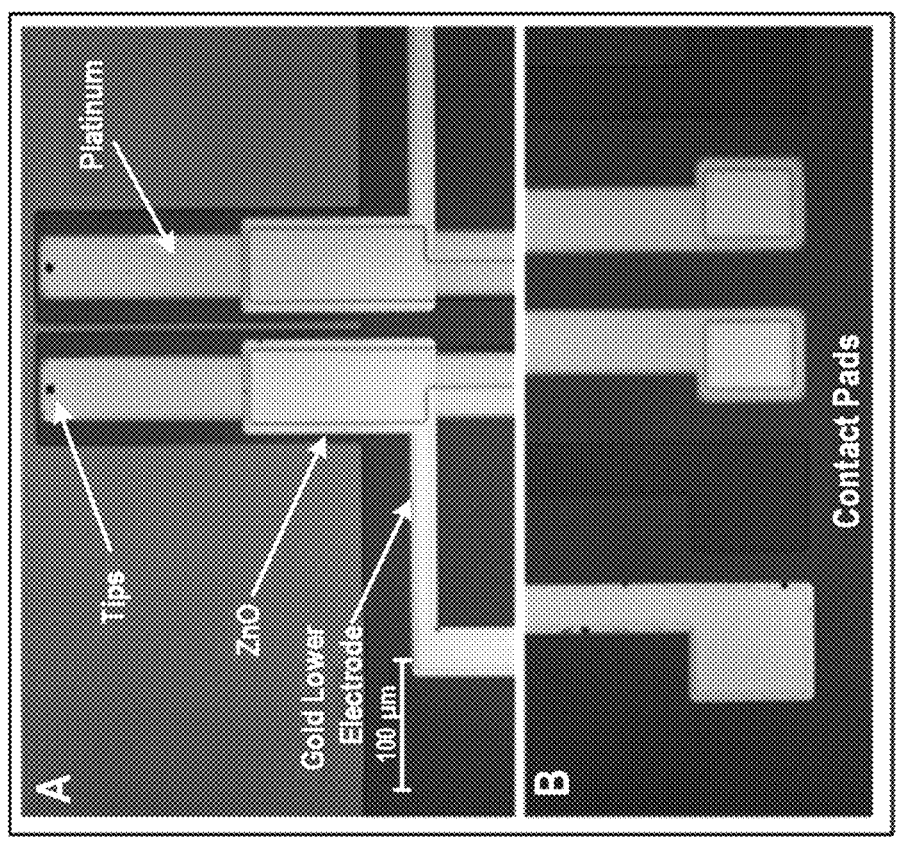
FIG. 17A shows cantilevers with the piezoelectric-actuation shaped components.
FIG. 17B shows contact pads for inputting electrical signals.

FIGS. 17A and 17B show optical images of fabricated parallel cantilevers. FIG. 17A shows cantilevers with the piezoelectric-actuation shaped components. The tips may be coated with platinum and further insulated with silicon nitride. FIG. 17B shows contact pads for inputting electrical signals.

In some embodiments of the disclosed technology, a robust multicolor optic system may be implemented by using a super continuum white laser. Quadruple photodetectors may be incorporated to sense the deflection of each color of the laser from the multiple cantilevers. Commercially available AFM probes with multiple cantilevers may be used so that the development of the system can be initiated in parallel with the fabrication of multiple cantilevers.

The robust multicolor optical system implemented based on some embodiments of the disclosed technology may be used to sense the deflection signals from multiple cantilevers. In an implementation, the optical system may include multiple cantilevers fabricated to provide parallel imaging of biological samples. For example, an array of cantilever 5×5 may be fabricated for utilizing in neuroscience applications.

Electrical noise in the external quadruple photodetector could have higher noise than the detector in the AFM. This could be resolved by setting up the system in an electrical shield case. In order to use the array of cantilever, same number of photodetector would be needed. This problem could be resolved by incorporating a CCD detector that can track different colors of the laser with a pot tracking system. In this manner, the detection of deflection signal from multiple cantilevers would not be tracked by using only one detector.

Figure 18:
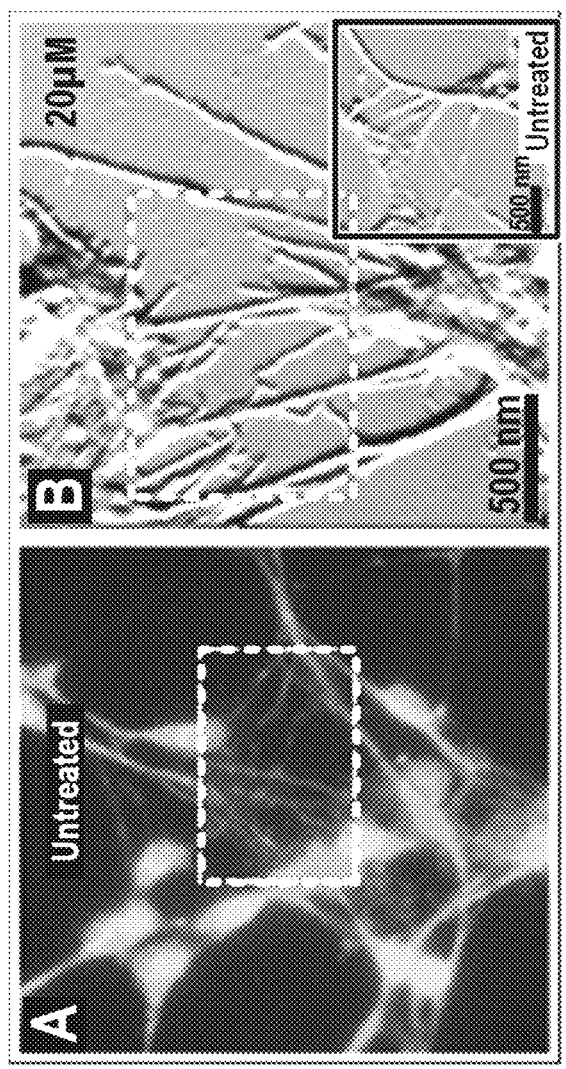
FIGS. 18A and 18B show Aβ17-42 (p3) induced dose-dependent neurite degeneration and cell death using immunofluorescence imaging and AFM.

FIGS. 18A and 18B show Aβ7-42 (p3) induced dose-dependent neurite degeneration and cell death using immunofluorescence imaging and AFM. Some embodiments of the disclosed technology may integrate conducting probes and the cantilever for functional electrical recording to create a cantilever capable of imaging the localized ionic currents and voltages of cells in a synaptic network. Studying only the structure of synaptic network provides an incomplete picture of how the brain actually operates because a primary mechanism by which cells in the brain communicate and store information is through electrical signal propagation. Understanding the functional encoding of information that goes hand-in-hand with the structural organization is a critical aspect of understanding how the brain operates. Some embodiments of the disclosed technology may address this need by integrating functional recording into an AFM cantilever.

Electrical recording of localized signals requires that partial control of the depth of insertion of the probe into the substrate. However, to measure electrical activities only from nanometrically localized membrane ion channels, the probe needs to be electrically isolated everywhere the recording electrode as to reduce the recording area and functional limit the amount of current received by the probe. Some embodiments of the disclosed technology may provide a track record of creating technology for localized electrical recording using micro-wires and glass pipettes. While integrating the conducting probe with technology proposed in this patent document, careful consideration may be given to isolating the electrical recording from the sensing and actuating to prevent "cross-talk" between the actuators and the signals of interest. Failure to do this properly may result in increased noise and false data.

To create a conducting cantilever tip, the probe is coated with a metallic conducting material. Platinum, a noble metal, is resistant to electrochemical degradation, limiting possible contamination of the recording probe. To overcome the poor adhesive properties of platinum, an adhesion layer of 20 nm titanium will be deposited prior to depositing platinum (~100 nm). Currents may be conducted only through the tip apex of the cantilever to minimize electrical noise. An insulating layer of nitride may be deposited to separate the conducting probe from the actuators and sensors. The tip apex can then be exposed by removing the nitride layer using a focused ion beam.

Conducting probes may be created with the ability to image localized currents and voltages for recording synaptic transmission of neuron cells and ion channels. The recording area of the probe will be limited to <50 nm to reduce extraneous currents and improve the localized recording capabilities. Carbon nanotubes can be pursued as an alternative to platinum for the recording tip. They can be introduced to the cantilevers through seeding the surfaces with a small amount of gold and growing them directly. Failure of the probes to sufficiently insulate the tips can be overcome with electrophoretic paints, conformal parylene coating, or atomic layer deposition of $Al_2O_3$ with selective removal by using a focused ion beam. If the electrical recording is not fully integrated with the AFM cantilever array, a micro-electrode array may be utilized in conjunction with the AFM-array. Some embodiments of the disclosed technology may enable some functional recording of the synaptic networks to allow structure-function imaging at high resolutions.

Figure 19:
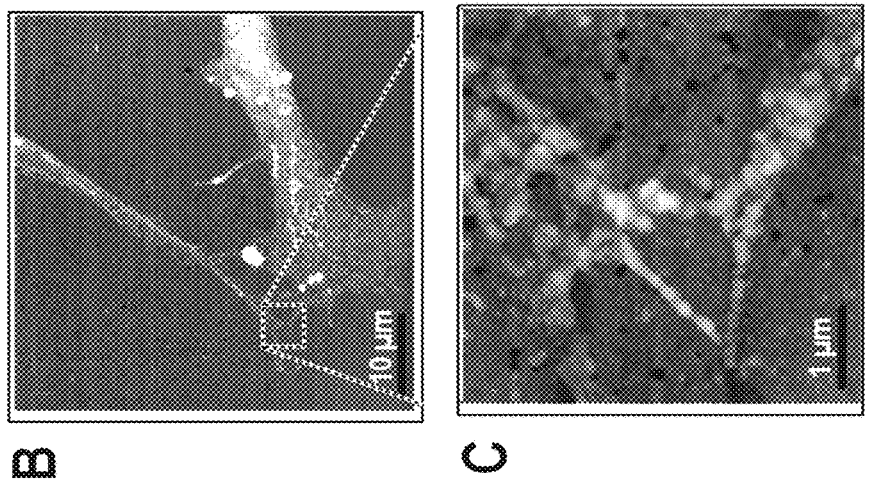
FIG. 19A shows bright field optical image of neurons and the positions of two parallel cantilevers.
FIG. 19B shows AFM image of neuronal synapse.
FIG. 19C shows zoomed in image from the dotted box region.
Figure 19:
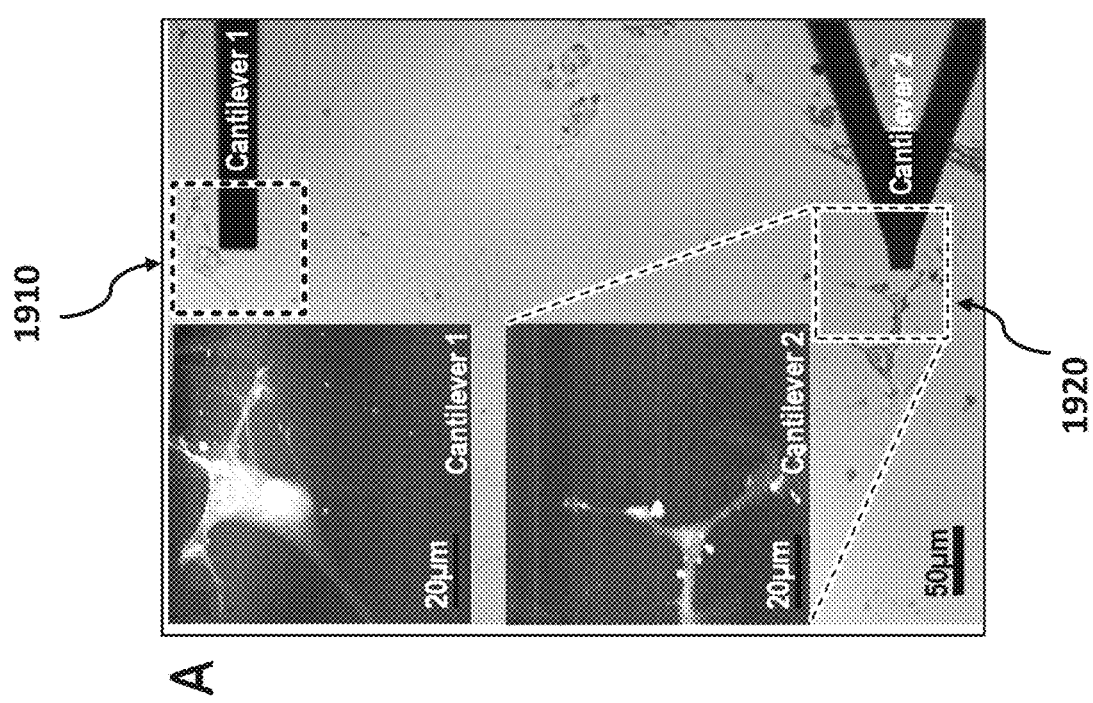

FIGS. 19A-19C show simultaneous parallel AFM imaging of fixed human differentiated neural progenitor cells (NPCs) derived from induced pluripotent stem cells (iPSCs). FIG. 19A shows bright field optical image of neurons and the positions of two parallel cantilevers. Top and bottom insets are AFM images of neurons from the dotted box regions 1910 and 1920 using Cantilever 1 and Cantilever 2, respectively. FIG. 19B shows AFM image of neuronal synapse, and FIG. 19C shows zoomed in image from the dotted box region.

The AFM systems implemented based on some embodiments of the disclosed technology may be used for imaging cultured neurons and functional study of live synaptic networks to create enabling nanotechnology for the high-resolution imaging of synaptic networks and to examine the role of amyloids on their structures. For that end, the AFM systems implemented based on some embodiments of the disclosed technology may be used to image and record the activity of functional neurons and synaptic networks. Electrical recording and imaging of thin brain slices have been effectively utilized to understand the brain connectivity. Neuronal responses such as formation of synapses and transmission of electrical currents have been studied in cultured neuronal network. However, changes in structures of neurons or proteins presented in neuronal membranes in response to electrical activities have not been able to study due to lack of imaging resolution and techniques. As shown in FIGS. 18A and 18B, short amyloid beta oligomers (Aβ17-42 or p3) cause neurite degeneration and cell death. However, the conducting AFM-array implemented based on some embodiments of the disclosed technology may be used to image the structure and location of proteins that are involved in synaptic transmission while recording localized electrical signals with and without applied stimuli.

To demonstrate that the parallel AFM system implemented based on some embodiments of the disclosed technology can image the neuronal cells, fixed neurons may first be imaged. Preliminary data may demonstrate the simultaneous AFM imaging of fixed human differentiated neuronal progenitor cells (NPCs) derived from induced pluripotent stem cells (iPSCs) using two parallel AFM probes as shown in FIGS. 19A-19C. The morphology of the neuronal cells as well as their cellular junctions (synapse) may be imaged as shown in FIGS. 19B and 19C. Detail structures near the synapse region may be imaged. Fixed neurons may be imaged to study any structural changes after introduction of amyloid beta proteins.

Figure 20:
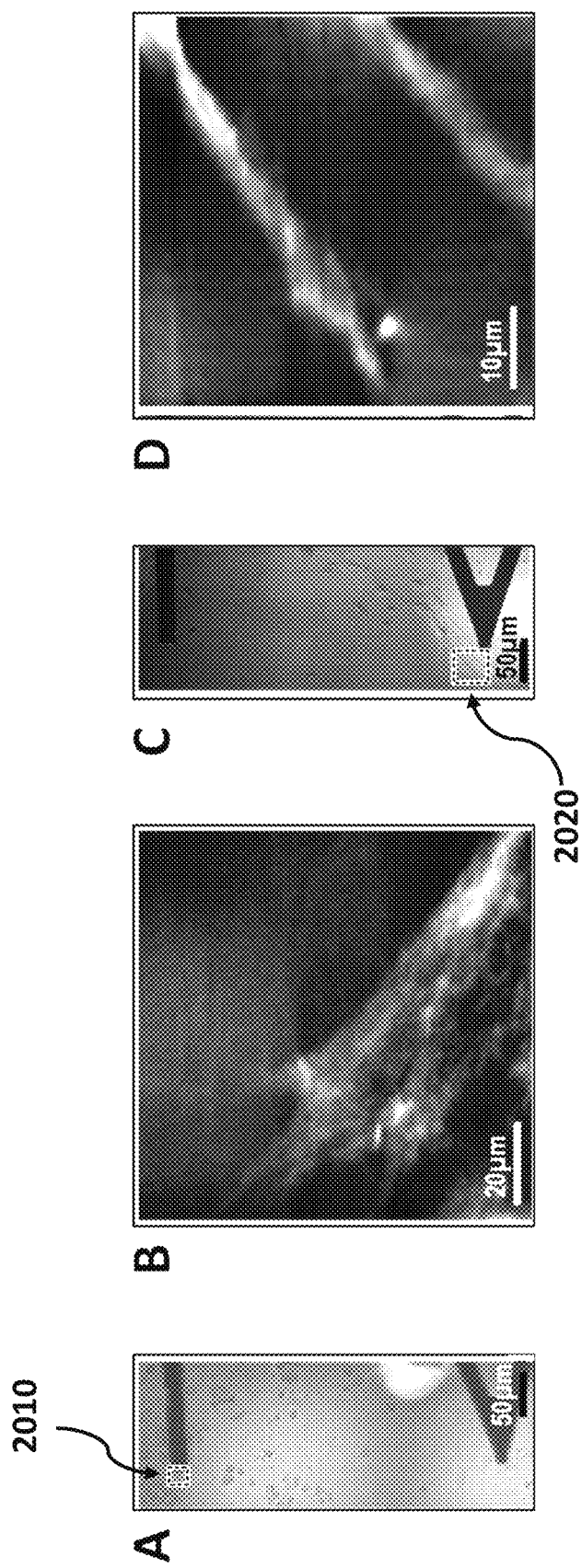
FIG. 20A shows an optical image of live human differentiated neural progenitor cells (NPCs) derived from induced pluripotent stem cells (iPSCs) with two parallel cantilevers.
FIG. 20B shows AFM image of neuronal body from a dotted box region in FIG. 20A.
FIG. 20C shows an optical image of live neurons in different location with two parallel cantilevers.
FIG. 20D shows AFM image of axonal structures of a neuron from a dotted box region in FIG. 20C.

FIG. 20A shows an optical image of live human differentiated neural progenitor cells (NPCs) derived from induced pluripotent stem cells (iPSCs) with two parallel cantilevers. FIG. 20B shows AFM image of neuronal body from a dotted box region 2010 in FIG. 20A. FIG. 20C shows an optical image of live neurons in different location with two parallel cantilevers. FIG. 20D shows AFM image of axonal structures of a neuron from a dotted box region 2020 in FIG. 20C.

Cultured neuron may initially be imaged with the AFM-array to determine aspects of transmission between cells in culture and to reduce the complexity of the system. The AFM array system implemented based on some embodiments of the disclosed technology may image live neurons simultaneously as shown in FIGS. 20A-20D. Cytoskeleton structures and the extension of growth cone may be imaged.

To study live neuronal network, it is important to monitor how neuronal electrical signal is transported. The parallel conductive AFM probes implemented based on some embodiments of the disclosed technology have a capability of simultaneous electrical current measurement. Using this parallel conductive probe, electrical activity of neuronal network may be monitored to study the effect of their signal transport by amyloid proteins. The structures of neuronal network may be defined while recording the electric currents of neurons. Some embodiments of the disclosed technology may be used to elucidate the high resolution structures of synaptic junctions and correlate the structures with their functional electrical recordings in the presence of applied stimuli, and may be used to image receptors and ion channels present at the synaptic junctions and define different protein conformations. Correlative structural and functional imaging of live cell could be difficult because of the complexity of the cell expressing various ion channels in the cellular membranes. In such case, active ion channel proteins can be reconstituted in model lipid membranes and their correlative structures and functions can be studied.

Figure 21:
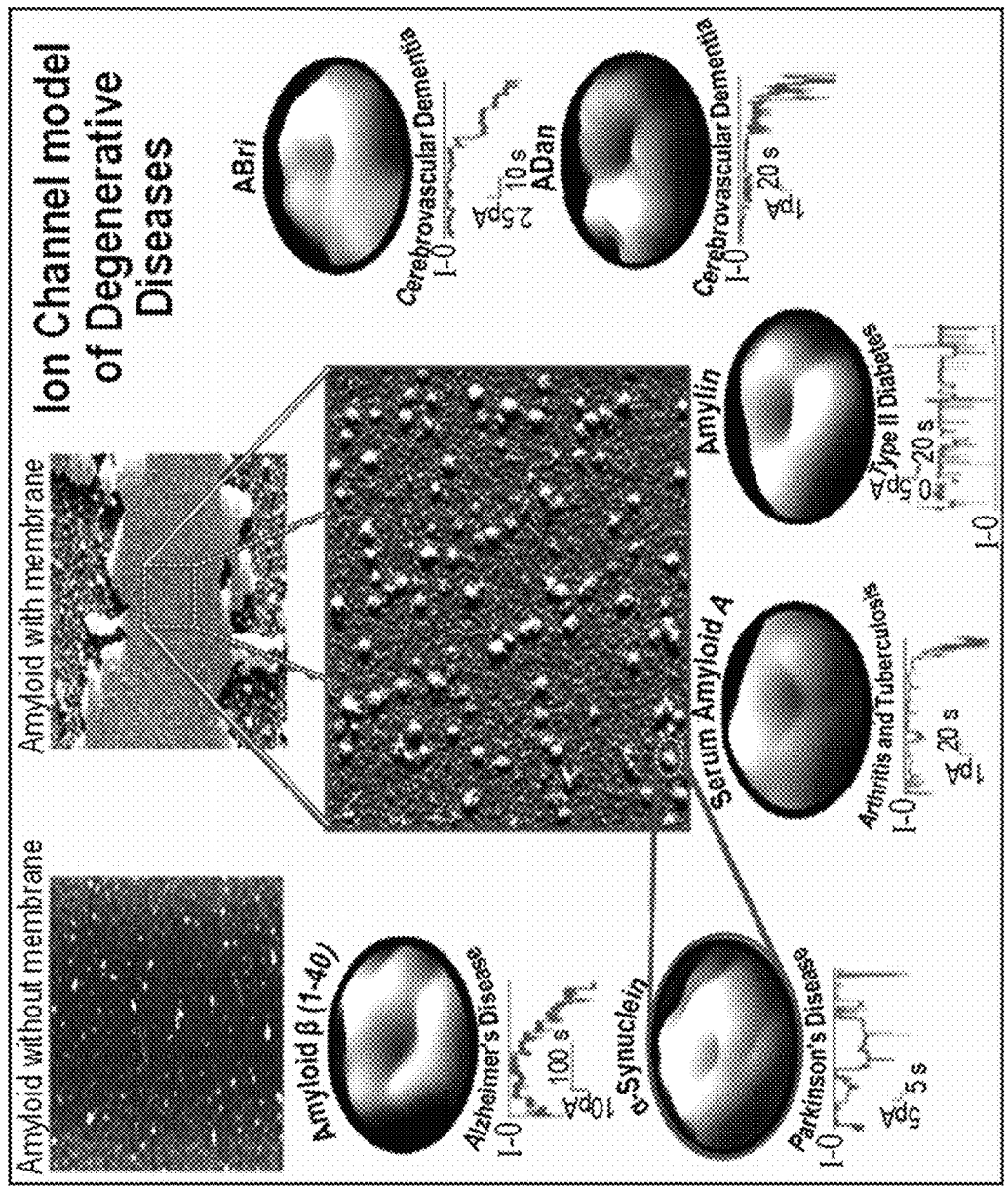
FIG. 21 shows an ion channel model of degenerative amyloid diseases.

FIG. 21 shows an ion channel model of degenerative amyloid diseases. AFM images show structures of isolated globular amyloid beta (Top left panel), a bilayer membrane with reconstituted amyloid beta peptide (top middle panel) and ion channel-like structures for amyloid beta 1-40 (middle left and middle panels), alpha-synuclein (bottom left panel), serum amyloid A (bottom second panel from the left), amylin (bottom third panel from the left), SOD1 (bottom right panel), and ABri and ADan (right second and third panels). Electrical conductance of ion channels is shown in the bottom of each AFM images. Similar structures are reported from our lab for various other amyloids.

The AFM systems implemented based on some embodiments of the disclosed technology may be used to image structural and functional changes in response to various oligomeric amyloids, including amyloid beta, alpha-synuclein, FTD43. For example, a multi-modal AFM array implemented based on some embodiments of the disclosed technology may be used to examine conformational changes (in structural and functional properties) of neuronal networks in response to various amyloid disease related proteins such as amyloid β, α-Synuclein, Amylin and other amyloids if time permits.

Various amyloid proteins form ion channels in membranes and show heterogeneous electrical conducting activities as shown in FIG. 21. These amyloid ion channels are believed to play major role in causing Ca2+ ion uptake in neurons which leads to cellular death. While many researchers have studied various ion channel forming amyloid proteins, most of these studies were conducted in model lipid membranes. Despite of these structural and functional studies, the connection between calcium ion uptake in cellular system and ion channel structures of amyloid proteins in model lipid membrane system needs to be improved. To elucidate the exact mechanism of amyloid diseases, direct correlation of the structural and functional studies will be required. In some embodiments of the disclosed technology, the array AFM system with the conducting multi-cantilever with independent actuators may be used to illuminate the role of amyloid ion channels in cellular structure and function. Any modulation of cellular structures or functions by disease causing proteins may be monitored in real time.

To test the effect of amyloid proteins, cultured neurons may be imaged first by using parallel AFM array, and initial structures as well as electrical activities may be assessed before introduction of amyloid proteins. Oligomeric amyloid peptides will be added on-line and after certain time of incubation, the structures and electrical activities of cultured neurons may be recorded. Various amyloid proteins may be introduced to the neurons, and their response may be monitored in a concentration dependent manner and in real time.

As a result, structure and function of neurons before and after the treatment of ion channel forming amyloid proteins may be simultaneously imaged. Structure and electrical current of live network of neurons may be measured simultaneously to obtain valuable information about how neuron transport signal in local area as well as the relationship between structure and function, and changes in structures and activity of neurons in response to amyloids proteins may be elucidated.

The response time after treatment of amyloid oligomers in live neurons could be not immediate. In such case, the neuronal responses may be tracked in time lapse manner. Otherwise, the structures and functions of two separate samples with/without amyloid proteins may be compared with each other.

The AFM array system implemented based on some embodiments of the disclosed technology is capable of multi-scale and multimodal structure-function studies of integrated systems and networks, including synaptic networks which mediate virtually all cognition, memory and related degenerative diseases such as Alzheimer's disease. The AFM array system may have 5-10 nm spatial resolution that is suitable for studying ion channel structure and function in neurons. In some embodiments of the disclosed technology, the multicolor optical system using different wavelength for each cantilever may reduce crosstalk between the multi-cantilever for a stable structural imaging. The AFM systems implemented based on some embodiments of the disclosed technology may be used for imaging cultured neurons and functional study of live neuronal networks. The AFM systems implemented based on some embodiments of the disclosed technology may be used to examine the effects of various amyloids on the neuronal network activity and global structural changes which will provide key information about the basis of AD pathology. The disclosed technology may create enabling nanotechnology to enhance our understanding of brain function at a nano-to-macro scale in line with both AD as well as the broader Brain Initiative.

Some embodiments of the disclosed technology relate to multidimensional and multi-functional array-AFM integrated with other nanoscopes and functional assay tools (array-AFM) which enables multi-point nanoscale imaging, manipulations and designing structure with multi-parametric features and properties.

The multidimensional and multi-functional array-AFM implemented based on some embodiments of the disclosed technology can be used to gain fundamental understanding of the nanoscale stimuli-material interactions for both designed nanomaterials as well as presently available metamaterials. The array-AFM implemented based on some embodiments of the disclosed technology can also be used as a novel multimodal nano 3-D printer, design new advanced materials with nanoscale defined (mechanical, optical, electrical, magnetic) functional properties.

Our quality of life and security are controlled by our positive interaction with our surrounding: the interface of our body surface and the materials and forces of our surrounding. Future generation of sensors and devices for effective monitoring of these interactions will be small, preferably nanoscale, multimodal (multifunctional), energy efficient, and durable. They would consist of thin interfacial layers of engineered advanced materials with nanoscale atomic and molecular heterogeneities which control their emergent properties. Such multifunctional sensors and devices are abundant in living biological systems: biological interfaces consist of nano-to-meter sized macromolecular sensors (e.g., channels and receptors,) in cell membranes of all multi-cellular tissues and organs. All external physical, chemical and biological stimuli from our surroundings (e.g., heat, light, force, pressure, (in-) organic molecules) interact at the membrane interface—the first wall of protectors. Unfortunately, there are only a few unifying physical principles to explain and predict their action.

The multidimensional array-AFM implemented based on some embodiments of the disclosed technology may be used to design nanoscale multi-parametric 3D nano interfaces and the 3D structure and activity of nanoscale interface materials. In some implementations, the multidimensional array-AFM may include functional assay tools to examine fundamental principles of stimuli-interface interactions. Some embodiments of the disclosed technology may also be used as a novel multimodal nano 3-D printer to design new advanced materials with defined (mechanical, optical, electrical, magnetic) functional properties.

The hierarchical relationship among heterogeneous materials with distinct physico-chemcial properties (e.g., piezo, opto-electronic, conducting layers) in metamaterials as well as membranes with multiple different channel and receptors, cells, and tissues in biological systems is defined by their cooperative and coordinated interactions. For instance, the nanoscale activity of membrane ion channels and sensory receptors in response to external stimuli governs the cooperative intercellular signal transduction and overall (macroscale) body response, including sensation of heat, pain and stress. Similarly, efficient multi-dimensional sensors using metamaterials will rely on efficient inter-conversion of representative physico-chemical energies, forces and fields. The multidimensional array-AFM implemented based on some embodiments of the disclosed technology may be used to know how the nanoscale systems respond to external stimuli and transport their emergent activity.

Some embodiments of the disclosed technology relate to techniques for simultaneous study of nanoscale structure and activity, especially interfaces where external stimuli normally interact. Unlike multi-electrode array, fluorescent indicator and magnetic resonance imaging, which can only record activity from large-scale cell populations with low spatial resolution, the multidimensional array-AFM implemented based on some embodiments of the disclosed technology can measure multiple events simultaneously with their 3D structural conformations at the nanoscale.

Figure 22:
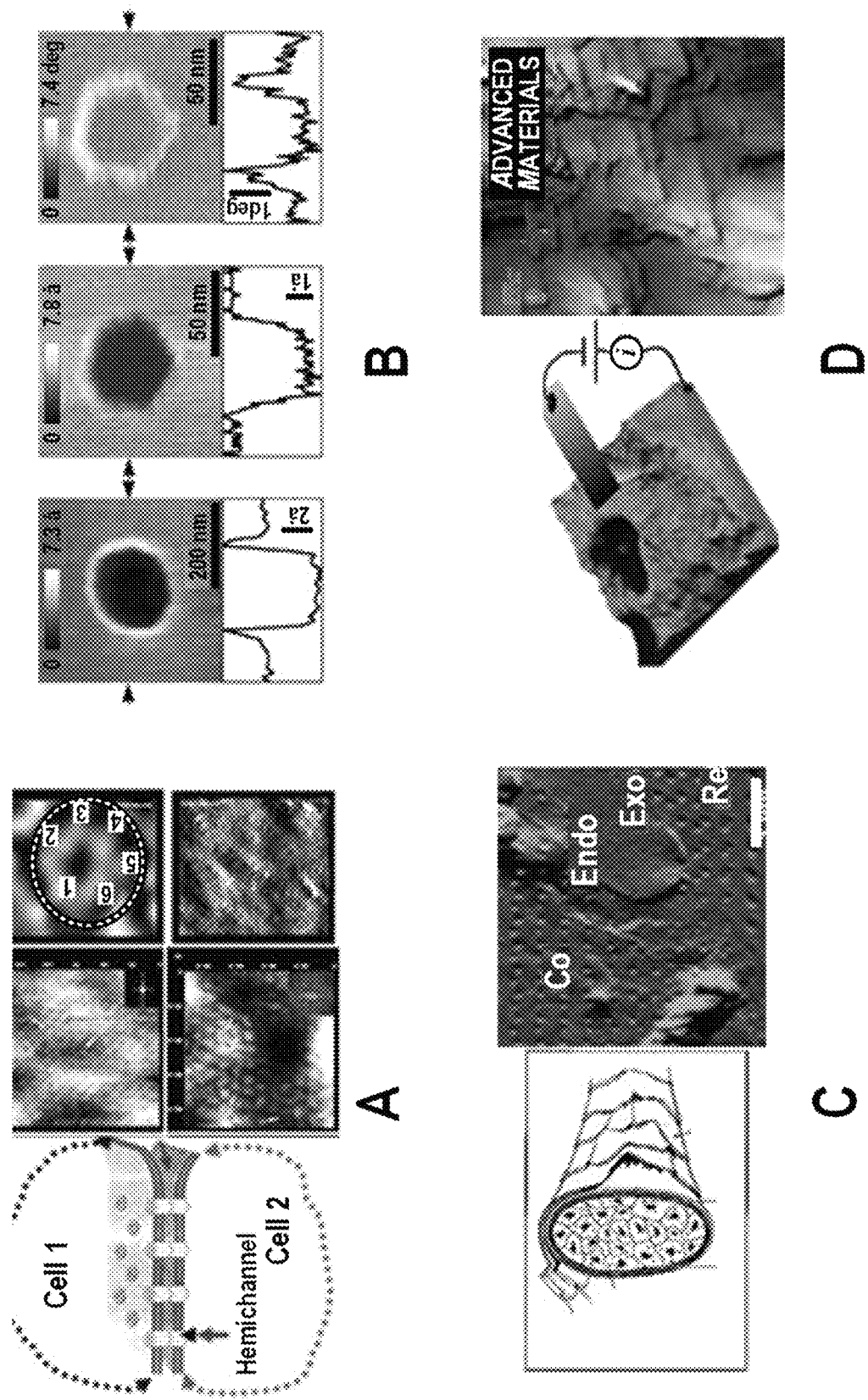
FIG. 22A shows nano-dissection and ion channel molecular structure.
FIG. 22B shows interfacial energy map on atomic step in graphite pit.
FIG. 22C shows nano-indentation (nano-holes) in heterogeneous material.
FIG. 22D shows correlating structure and transport properties in PEDOT polymer blend.

FIG. 22A shows nano-dissection and ion channel molecular structure. FIG. 22B shows interfacial energy map on atomic step in graphite pit. FIG. 22C shows nano-indentation (nano-holes) in heterogeneous material. FIG. 22D shows correlating structure and transport properties in PEDOT polymer blend.

Atomic force microscopy (AFM) allows electron microscopy (EM) equivalent resolution for imaging native biological samples, e.g., sub-nanometer resolution images of ion channels and receptors (gap junction ion channels). AFM allows integration of many functional tools. The disclosed AFM technology here can be implemented in various ways, including providing multimodal AFM-based ionic and molecular transport measuring apparatus that includes innovative chip-based TIRF, nanopore support system, and microfluidics. AFM provides direct structure-activity info (e.g., current in conducting materials), maps the energy states and creates structures (e.g., nano holes by nano-indentation) and nano-dissect multi-layered systems.

Figure 23:
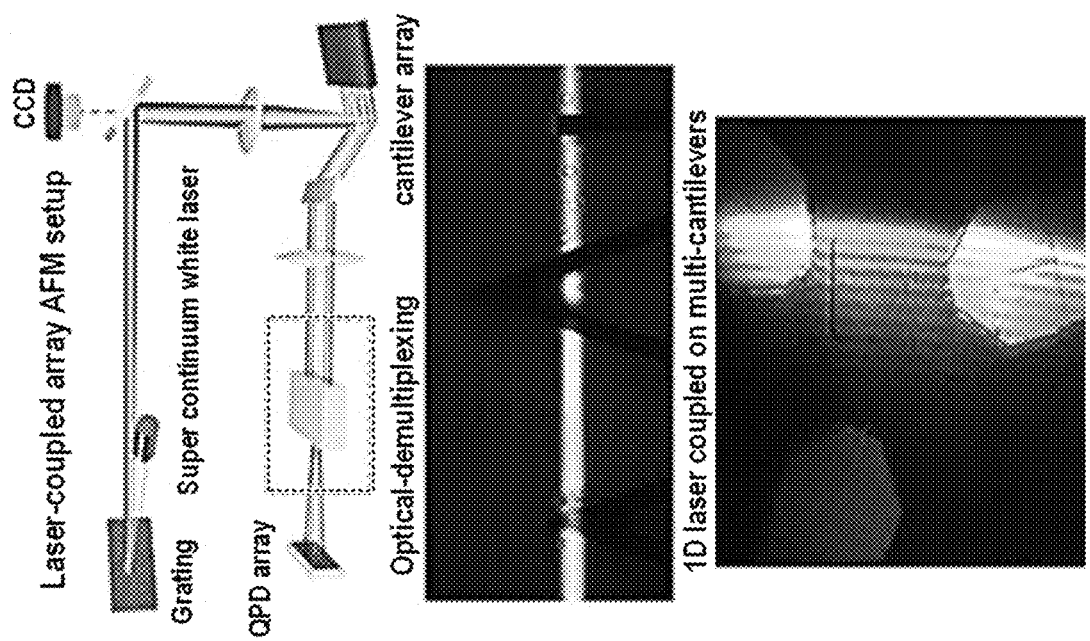
FIG. 23 shows an example of laser-coupled array AFM implemented based on some embodiment of the disclosed technology.
Figure 24:
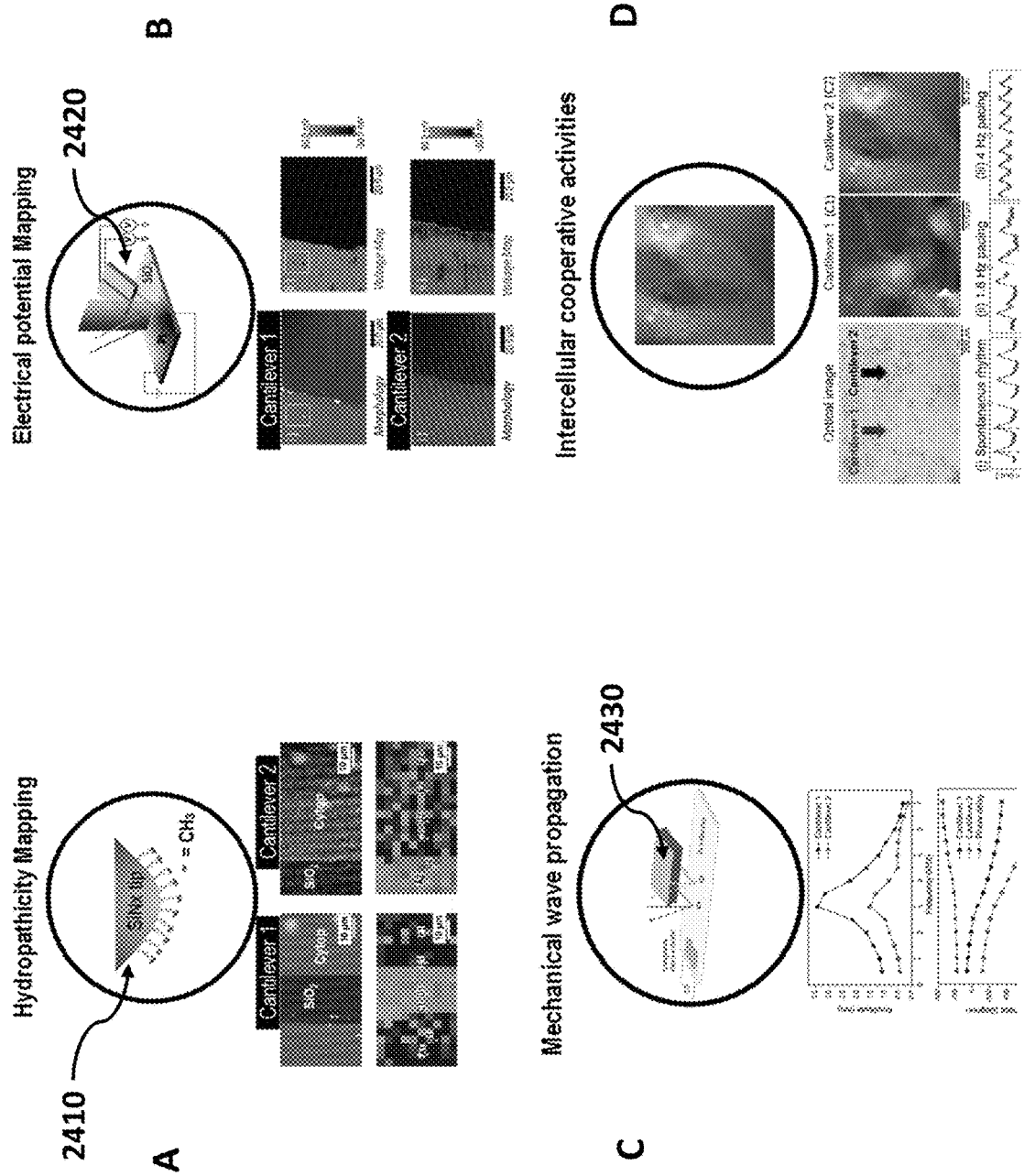
FIG. 24A shows hydropathicity mapping using the array AFM implemented based on some embodiment of the disclosed technology.
FIG. 24B shows electrical potential mapping using the array AFM implemented based on some embodiment of the disclosed technology.
FIG. 24C shows mechanical wave propagation using the array AFM implemented based on some embodiment of the disclosed technology.
FIG. 24D shows intercellular cooperative activities measured using the array AFM implemented based on some embodiment of the disclosed technology.

FIG. 23 shows an example of laser-coupled array AFM implemented based on some embodiment of the disclosed technology. FIG. 24A shows hydropathicity mapping using the array AFM implemented based on some embodiment of the disclosed technology. FIG. 24B shows electrical potential mapping using the array AFM implemented based on some embodiment of the disclosed technology. FIG. 24C shows mechanical wave propagation using the array AFM implemented based on some embodiment of the disclosed technology. FIG. 24D shows intercellular cooperative activities measured using the array AFM implemented based on some embodiment of the disclosed technology.

As shown in FIG. 23, a dispersive grating spreads a supercontinuum laser to multicolor lasers, and these lasers with distinct wavelengths are directed to a cantilever array through one or more lenses and one or more mirrors. The cantilever array includes a plurality of cantilevers structured to detect a sample and deflect the lasers with distinct wavelengths by moving in position based on an interaction with the sample to produce multiple deflected output beams at different output optical wavelengths from the cantilevers. The lasers deflected by the plurality of cantilevers are demultiplexed by an optical frequency demultiplexing component and monitored by quadruple photo detectors (QPDs) that are placed relative to the optical frequency demultiplexing component.

As shown in FIG. 24A, a chemically functionalized tip 2410 is used to discern hydrophilic and hydrophobic areas by adhesion force measurements. As shown in FIG. 24B, the array AFM 2420 based on some embodiments of the disclosed technology can be used for electrical potential mapping based on probe-sample interactions. As shown in FIG. 24C, the array AFM 2430 can be used to detect the wave propagation in a piezoelectric actuator encapsulated polymer film.

The array AFM technology disclosed in this patent document enables multi-point imaging and imaging multiple areas simultaneously, facilitating coordinated studies of connected networks (e.g., array of ion channels that regulate cell's electrical current). The array AFM implemented based on some embodiment of the disclosed technology may be used to map high-resolution structures, activity, and transport in complex advanced materials and biological systems well as 3-D the flow of interacting signals in real-time.

Figure 25:
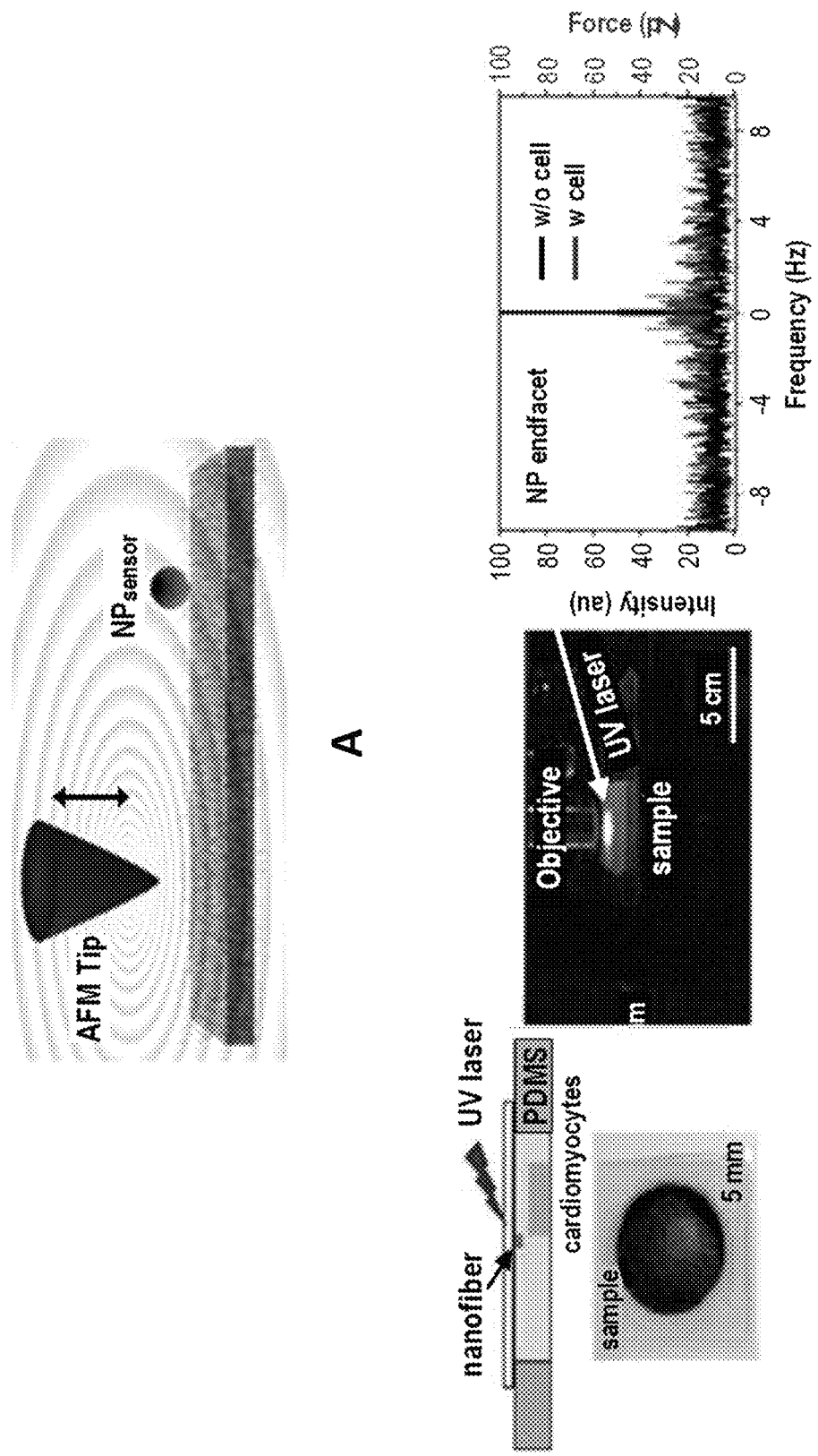
FIG. 25A shows acoustic frequency generated by AFM probe.
FIG. 25B shows imaging cardiomyocytes based on some embodiments of the disclosed technology.

FIG. 25A shows acoustic frequency generated by AFM probe. FIG. 25B shows imaging cardiomyocytes based on some embodiments of the disclosed technology. In some implementations, the disclosed technology can use AFM and advanced photonic materials and surface plasmon to image and map transport of acoustical wave and even bacterial vibration and heart beats with femto Newton force sensitivity.

Figure 26:
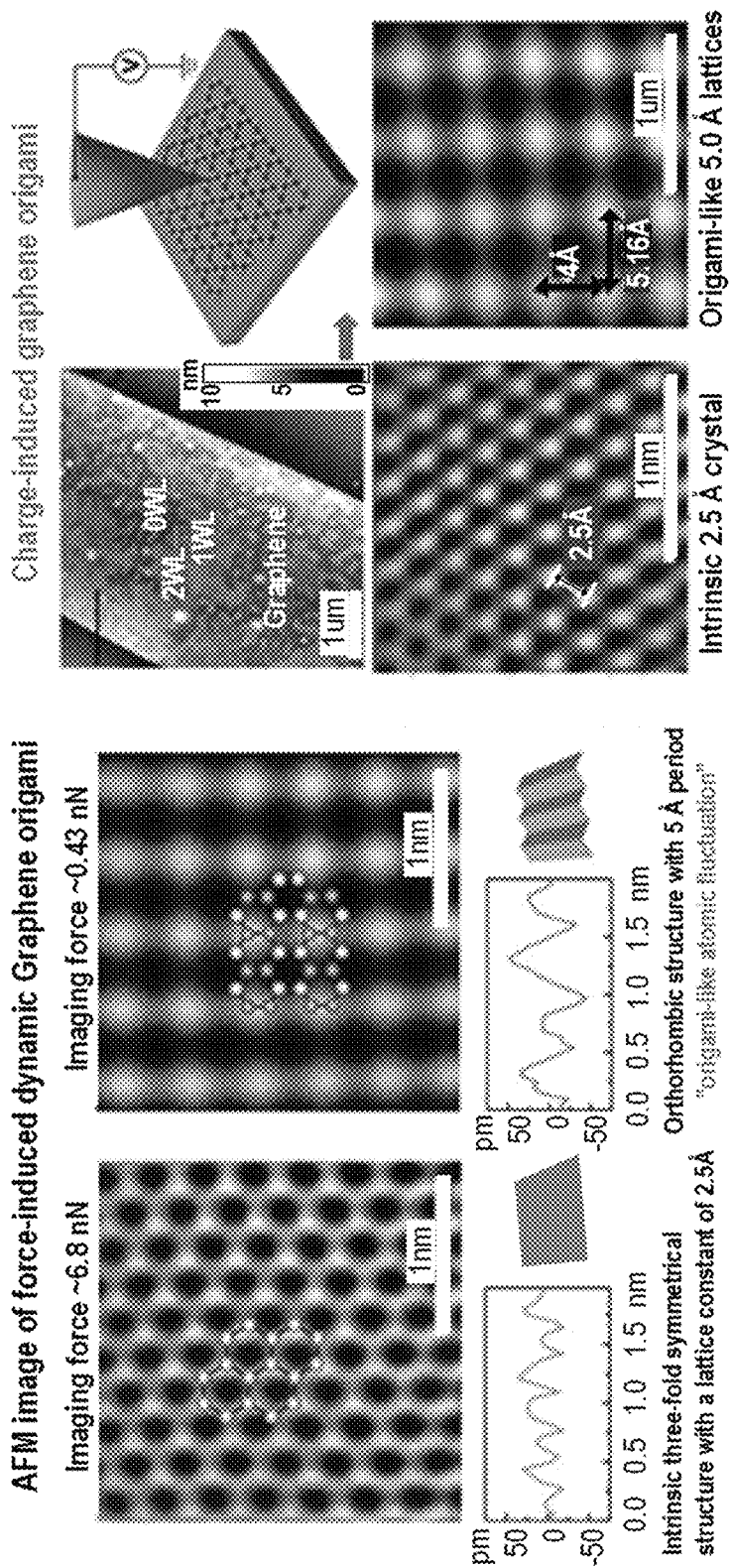
FIG. 26A shows AFM image of force-induced dynamic graphene origami.
FIG. 26B shows charge-induced graphene origami.

FIG. 26A shows AFM image of force-induced dynamic graphene origami. FIG. 26B shows charge-induced graphene origami. The AFM based force can be used to create dynamic graphene origami where applied force reversibly changes the atomic structure of graphene from 2.5 A to 5 A lattice constant and reverses back to normal when force is reduced.

Figure 27:
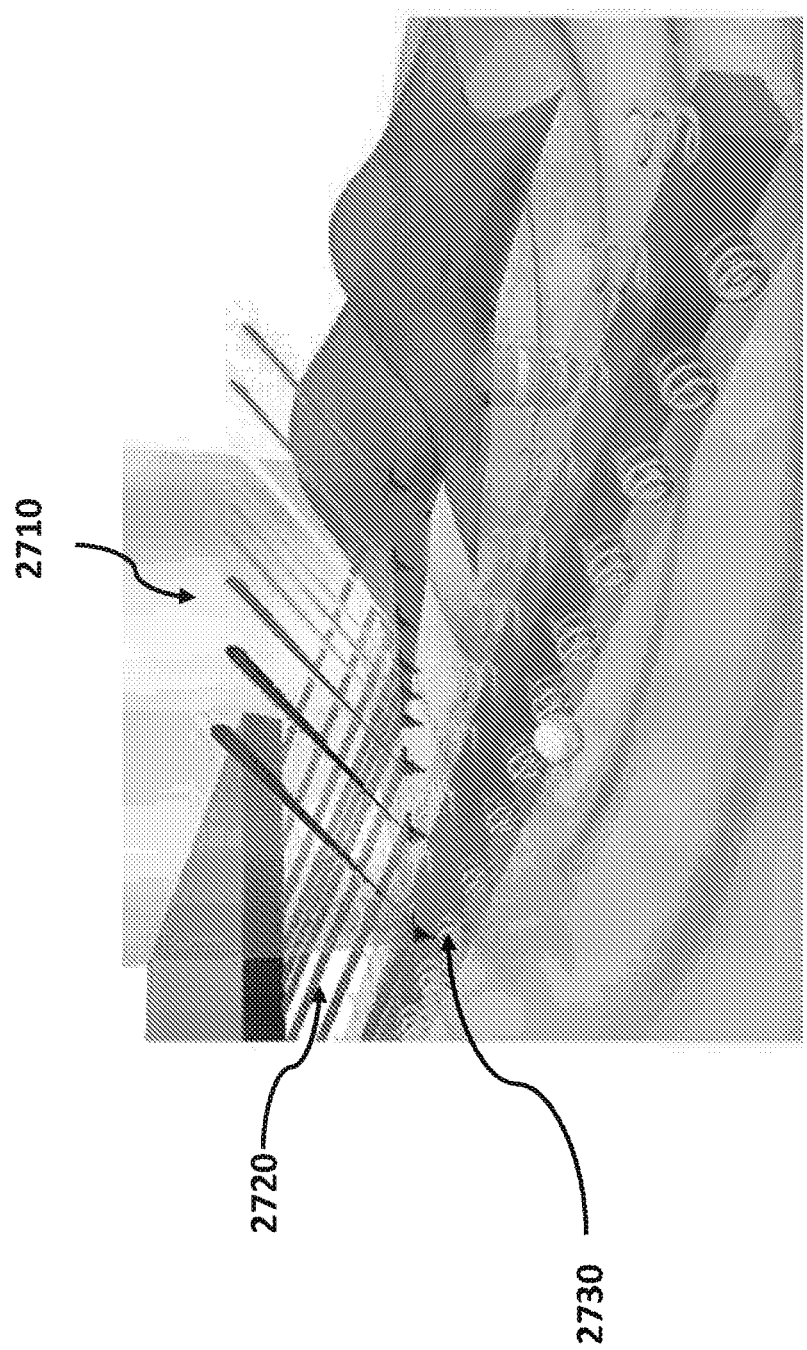
FIG. 27 shows simultaneous imaging of structure and physical properties using the array-AFM, showing approach for simultaneous imaging and mapping conductance from ion channels array and mapping mechanics of interfaces.

FIG. 27 shows simultaneous imaging 2710 of structure and physical properties using the array-AFM 2720, showing approach for simultaneous imaging and mapping conductance from ion channels array and mapping mechanics of interfaces, based on sample-cantilever interactions 2730. Some embodiments of the disclosed technology relate to using the array AFM to obtain fundamental biophysical understanding of the intermolecular interaction between single channels/receptors and harmful external stimuli. Some embodiments of the disclosed technology relate to using the array AFM to obtain fundamental understanding of the population dynamics of external stimuli-material interface atomic and molecular interactions.

Figure 28:
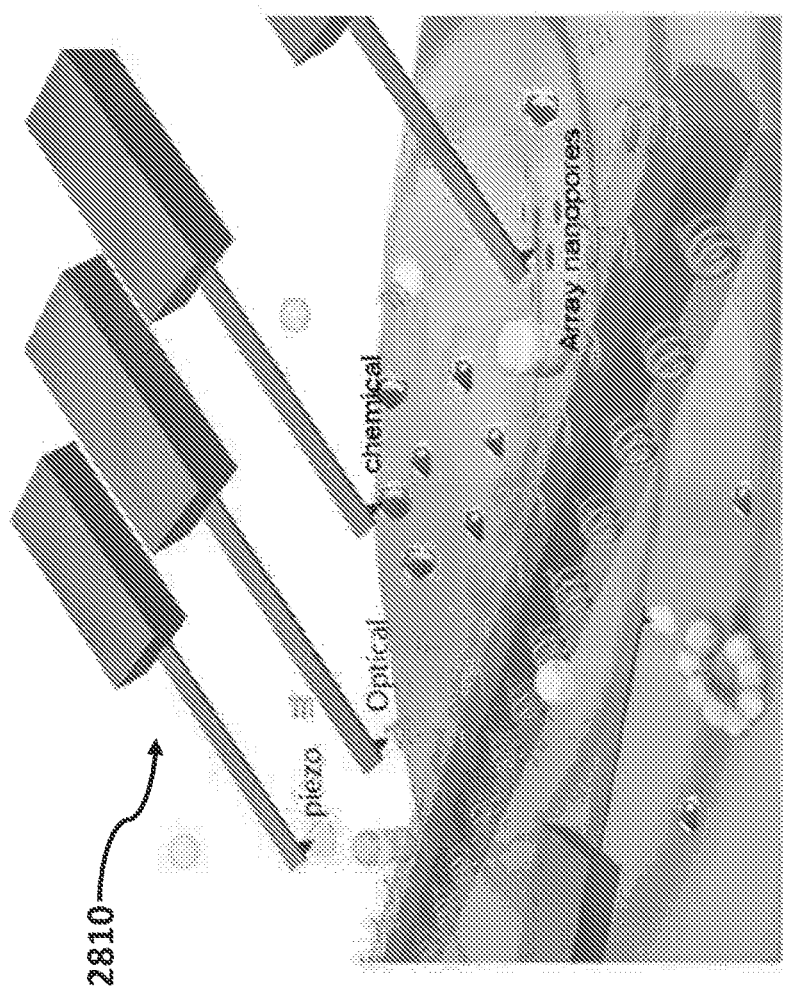
FIG. 28 shows a multimodal nano 3-D printer using the array-AFM where each probe is fully-functional 3-D actuator, sensor and force generator.

FIG. 28 shows a multimodal nano 3-D printer using the array-AFM where each probe is fully-functional 3-D actuator, sensor and force generator. The array-AFM includes cantilevers 2810 that can be a piezo actuator. The array-AFM includes cantilevers 2810 can be use optical interaction or chemical interaction with the sample. Some embodiments of the disclosed technology include using the array-AFM as a novel multimodal nano 3-D printer. The multimodal nano 3-D printer implemented based on some embodiments of the disclosed technology may be used to design new advanced materials with nanoscale defined (mechanical, optical, electrical, magnetic) functional properties. Where each probe is fully-functional 3-D actuator, sensor and force generator, the multimodal nano 3-D printer can imprint holes, adsorb materials with defined energy and physical features (light, temp, electrical sensitivity). Additionally, each probe can be designed to serve specific sensors (e.g., light, temp, electrical, mechanical) and thus will give real-time feedback for the newly designed 3D nano-materials. Such iterative feedback is not possible with current technology. In some embodiments of the disclosed technology, portable nanosensors may be implemented to detect emerging bio-threats as well as point-of-care predictive diagnosis of diseases using our patented technique.

As described above, some embodiments of the disclosed technology can provide most fundamental knowledge and basis of intermolecular interactions in advanced controlled-designed new materials with multifactorial functions as well as nano-bio interfaces (biological membranes; the first line of defense for human wellbeing) and environmental stimuli, including disease-causing molecule and bio-threat toxins, bacteria and viruses. In addition, some embodiments of the disclosed technology can be used for portable and wirelessly transmitted biosensors.

Figure 29:
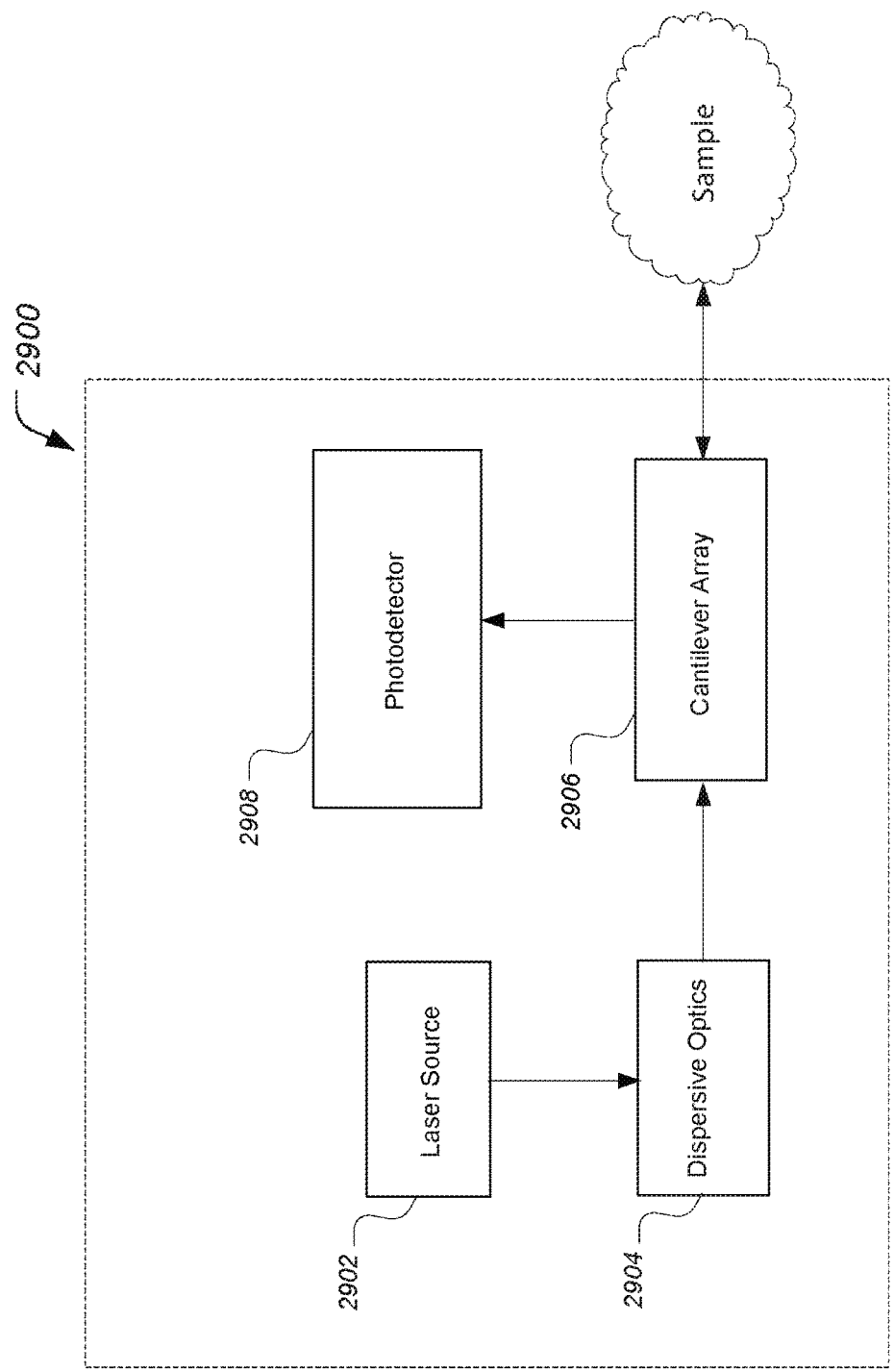
FIG. 29 shows an atomic force microscopy system implemented based on some embodiments of the disclosed technology.

FIG. 29 shows an atomic force microscopy system 2900 implemented based on some embodiments of the disclosed technology. The atomic force microscopy system 2900 includes a laser source 2902 configured to generate a laser beam containing light of different spectral light components at different optical wavelengths, a dispersive optics 2904 configured to disperse the laser beam into different dispersed light beams that are at different optical wavelengths and are spatially separated from one another, a cantilever array 2906 including a plurality of cantilevers structured to detect a sample and configured to deflect the different dispersed light beams by moving in position based on an interaction with the sample to produce multiple deflected output beams at different output optical wavelengths from the cantilevers, and a plurality of photodetectors 2908 to receive the multiple deflected output beams of different wavelengths from the cantilevers, respectively, wherein each photodetector is operable to detect a change in direction or position of each received deflected output beam. The dispersive optics 2904 and the cantilever array 2906 are positioned to spectrally and spatially map the plurality of cantilevers to the different dispersed light beams from the dispersive optics at different optical wavelengths such that each cantilever is illuminated by light at a distinguished optical wavelength.

In some implementations, the atomic force microscopy system 2900 may include an optical demultiplexer configured to further spatially separate the multiple deflected output beams of different wavelengths from the cantilevers.

In some implementations, the laser source 2902 may include a laser source that generates a single supercontinuum laser beam. In one example, the atomic force microscopy system 2900 may further include a dispersive grating configured to spread the single supercontinuum laser to multicolor lasers. In some implementations, the atomic force microscopy system 2900 may include a focusing lens that projects the multicolor lasers onto the cantilever array.

In some implementations, the dispersive optics include a series of dichroic beam-splitters. In some implementations, the photodetector includes a quadruple photo detector (QPD). In some implementations, the beam deflection from individual cantilever can be isolated and recorded by distinct wavelength selection. In some implementations, the atomic force microscopy system 2900 further includes an actuator on each cantilever to alter the deflection to maintain a constant interaction force between a tip of the cantilever and the sample. In one example, each of the cantilevers includes a chemically functionalized SiNx AFM tip with $CH_3$-terminated monolayer of octadecyltrichlorosilane (OTS) yielding a hydrophobic surface. In some implementations, the cantilever array may include parallel cantilevers. In some implementations, each of the cantilevers may include a conducting tip. In some implementations, each of the cantilevers is individually and independently controlled to allow for independent sensing from each cantilever and to allow for real-time positioning and modulation of the interaction force during imaging.

Figure 30:
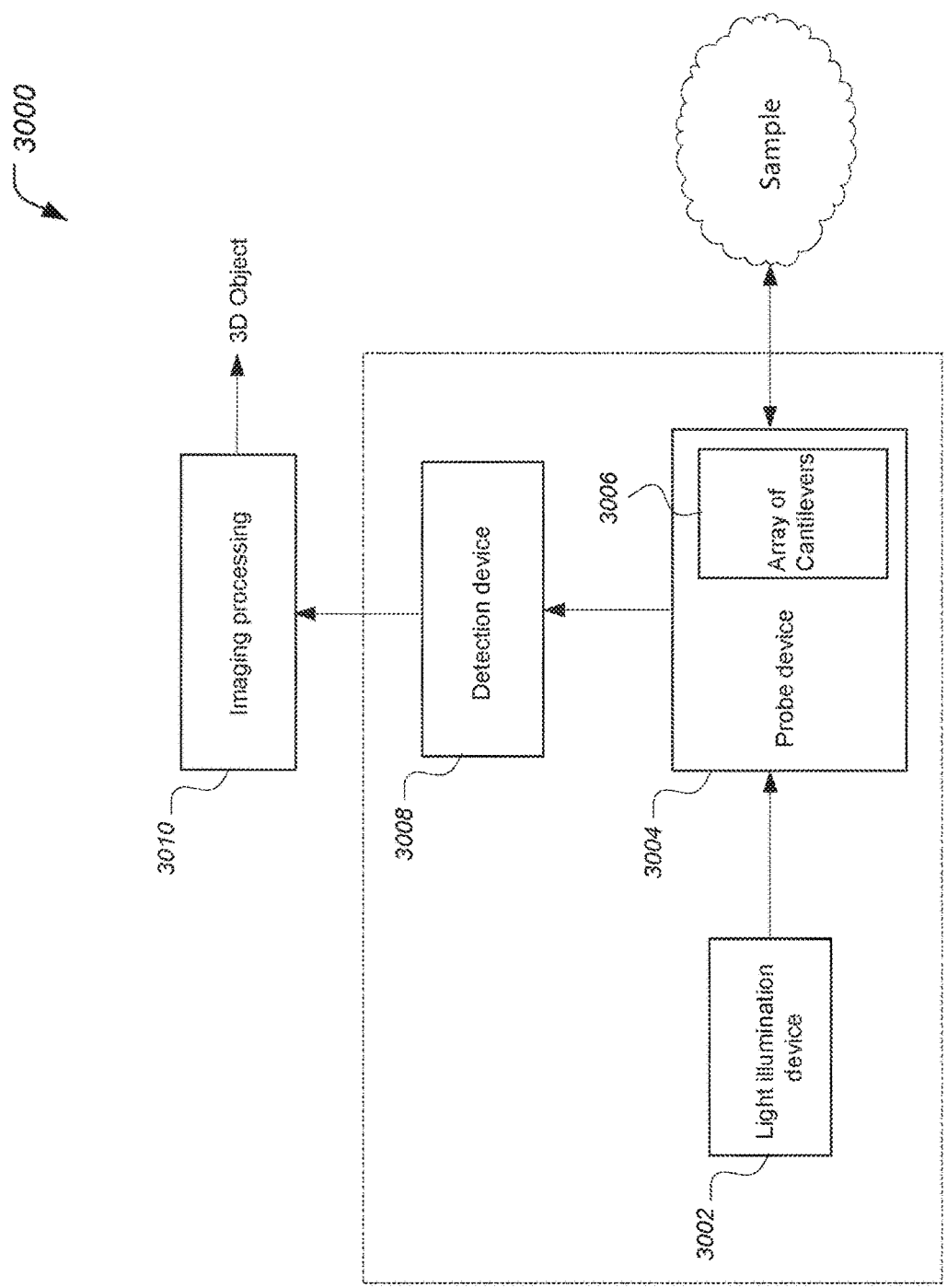
FIG. 30 shows a system implemented based on some embodiments of the disclosed technology.

FIG. 30 shows a system 3000 implemented based on some embodiments of the disclosed technology. The system 3000 includes a light illumination device 3002 configured to generate a plurality of dispersed light beams that are at different optical wavelengths and are spatially separated from one another, a probe device 3004 including a plurality of cantilevers structured to detect interactions between one or more samples and the plurality of cantilevers, each of the plurality of cantilevers configured to deflect the plurality of dispersed light beams by moving in position based on the interactions with the one or more samples to produce a plurality of deflected output beams at different output optical wavelengths from the plurality of cantilevers, and a detection device 3006 structured to receive the plurality of deflected output beams of different wavelengths from the plurality of cantilevers to map the plurality of deflected output beams to properties of the one or more samples by detecting changes in direction or position of the plurality of deflected output beams.

In some implementations, the system 3000 may further include an image processing device 3010 to reconstruct a three-dimensional model that represents topography of the one or more samples. In some implementations, the system 3000 may further include a device to produce a three-dimensional object based on the three-dimensional model. In some implementations, the three-dimensional object includes a functional three-dimensional material or a three-dimensional biological system.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring

What is claimed are techniques and structures as described and shown, including:

1. An atomic force microscopy system, comprising:
    a laser source configured to generate an optical probe beam containing light of different spectral light components at different optical wavelengths;
    a dispersive optical device positioned to receive the optical probe beam and configured to disperse the optical probe beam into different dispersed light beams that are at different optical wavelengths and are spatially separated from one another;
    a cantilever array including a plurality of cantilevers structured to detect a sample and configured to deflect the different dispersed light beams by moving in position based on an interaction with the sample to produce multiple deflected output beams at different output optical wavelengths from the cantilevers; and
    a plurality of photodetectors to receive the multiple deflected output beams of different wavelengths from the cantilevers, respectively, wherein each photodetector is operable to detect a change in direction or position of each received deflected output beam,
    wherein the dispersive optical device and the cantilever array are positioned to spectrally and spatially map the plurality of cantilevers to the different dispersed light beams from the dispersive optics at different optical wavelengths such that each cantilever is illuminated by light at a distinguished optical wavelength.

2. The system of claim 1, further comprising an optical demultiplexer configured to further spatially separate the multiple deflected output beams of different wavelengths from the cantilevers.

3. The system of claim 2, further comprising a dispersive grating configured to spread the single supercontinuum laser to multicolor lasers.

4. The system of claim 1, wherein the laser source generates a single supercontinuum laser beam.

5. The system of claim 4, further comprising a focusing lens that projects the multicolor lasers onto the cantilever array.

6. The system of claim 1, wherein the dispersive optics include a series of dichroic beam-splitters.

7. The system of claim 1, wherein the photodetector includes a quadruple photo detector (QPD).

8. The system of claim 1, further comprising an actuator on each cantilever to alter the deflection and maintain a constant interaction force between a tip of the cantilever and the sample.

9. The system of claim 1, wherein each of the cantilevers includes a chemically functionalized tip yielding a hydrophobic surface to discern hydrophilic and hydrophobic areas by adhesion force measurements.

10. The system of claim 9, wherein the chemically functionalized tip includes SiNx AFM tip with $CH_3$-terminated monolayer of octadecyltrichlorosilane (OTS).

11. The system of claim 1, wherein the cantilever array includes parallel cantilevers and wherein each of the cantilevers includes a conducting tip.

12. The system of claim 1, wherein each of the cantilevers is individually and independently controlled to allow for independent sensing from each cantilever and to allow for real-time positioning and modulation of the interaction force during imaging.

13. A system, comprising:
    a light illumination device configured to generate a plurality of dispersed light beams that are at different optical wavelengths and are spatially separated from one another;
    a probe device including a plurality of cantilevers structured to detect interactions between one or more samples and the plurality of cantilevers, each of the plurality of cantilevers configured to deflect the plurality of dispersed light beams by moving in position based on the interactions with the one or more samples to produce a plurality of deflected output beams at different output optical wavelengths from the plurality of cantilevers; and
    a detection device structured to receive the plurality of deflected output beams of different wavelengths from the plurality of cantilevers to map the plurality of deflected output beams to properties of the one or more samples by detecting changes in direction or position of the plurality of deflected output beams.

14. The system of claim 13, further comprising an image processing device to reconstruct a three-dimensional model that represents topography of the one or more samples.

15. The system of claim 14, further comprising a device to produce a three-dimensional object based on the three-dimensional model.

16. The system of claim 15, wherein the three-dimensional object includes a functional three-dimensional material or a three-dimensional biological system.

17. The system of claim 13, wherein the light illumination device is configured to generate a single supercontinuum laser beam.

18. The system of claim 17, wherein the light illumination device further includes a dispersive grating configured to spread the single supercontinuum laser to multicolor lasers.

19. The system of claim 18, wherein the light illumination device further includes a focusing lens that projects the multicolor lasers onto the plurality of cantilevers.

20. The system of claim 13, the probe device further includes an actuator on each cantilever to alter the deflection to maintain a constant interaction force between a tip of each of the plurality of cantilevers and the one or more samples.

21. The system of claim 13, wherein each of the plurality of cantilevers is individually and independently controlled to allow for independent sensing from each cantilever and to allow for real-time positioning of each cantilever and analysis of the interactions during imaging.

* * * * *